United States Patent [19]
Koga

[11] Patent Number: 6,115,510
[45] Date of Patent: *Sep. 5, 2000

[54] IMAGE PROCESSING APPARATUS CAPABLE OF DISPLAYING IMAGE TO BE FORMED ON SHEET

[75] Inventor: Katsuhide Koga, Tokyo, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/680,698

[22] Filed: Jul. 18, 1996

[30] Foreign Application Priority Data

Jul. 20, 1995 [JP] Japan ..................... 7-184187

[51] Int. Cl.$^7$ .............. G06K 9/03; H04N 1/40; G03G 15/00; B42B 43/00
[52] U.S. Cl. ............. 382/309; 382/295; 382/306; 358/448; 358/452; 399/15; 399/408; 412/1; 412/11
[58] Field of Search ............... 358/453, 403, 358/404, 448, 452; 399/402, 408, 15, 410; 382/306, 305, 309, 295, 296; 345/118, 121; 412/1, 11

[56] References Cited

U.S. PATENT DOCUMENTS

| 4,864,350 | 9/1989 | Ishiguro et al. | 399/408 |
| 5,263,698 | 11/1993 | Higuchi et al. | 399/408 |
| 5,289,569 | 2/1994 | Taniguchi | 707/525 |
| 5,383,754 | 1/1995 | Sumida et al. | 412/11 |
| 5,461,459 | 10/1995 | Muramatsu et al. | 399/408 |
| 5,717,843 | 2/1998 | Tabata et al. | 399/408 |

Primary Examiner—Phuoc Tran
Assistant Examiner—Daniel G. Mariam
Attorney, Agent, or Firm—Fitzpatrick, Cella, Harper & Scinto

[57] ABSTRACT

In a copier with a stapler and a sorter, an image read with a reader unit and a mark indicating a binding position designated from an operation unit are displayed on a CRT, and after an operator checks the binding position, the image is printed out on a sheet by a printer unit and the printed sheets are stapled at the designated position with a stapler. In this manner, the sheets are prevented from being stapled at a different position from that the operator desires.

24 Claims, 22 Drawing Sheets

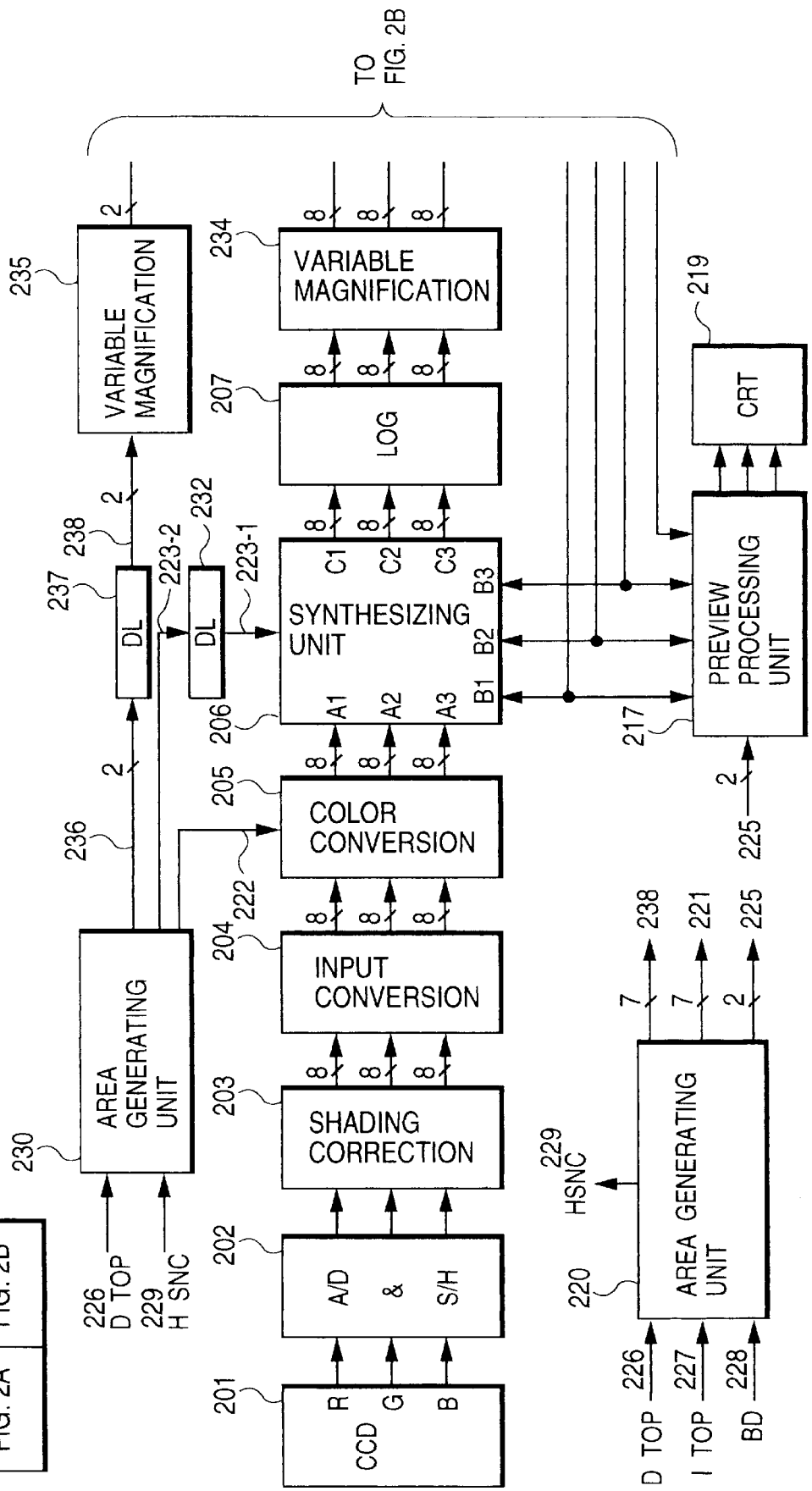

ROT=000

ROT=001

ROT=010

ROT=011

ROT=100

ROT=101

ROT=110

ROT=111

IMAGE PROCESSING APPARATUS CAPABLE OF DISPLAYING IMAGE TO BE FORMED ON SHEET

BACKGROUND OF THE INVENTION

1. Field of the Invention

The present invention relates to an image processing apparatus capable of displaying an image to be formed on a recording sheet.

2. Related Background Art

Some recent copiers have a sorter with a stapler. With such a stapler, copied sheets can be automatically bound with staples. The binding positions of staples are preset from an operation unit before a copy operation.

Even if desired binding positions are preset, sheets are bound at different binding positions if an original is set on an original support incorrectly. The operator is therefore forced to remove incorrectly bound staples.

SUMMARY OF THE INVENTION

It is an object of the present invention to an image processing apparatus capable of solving the above problem.

It is another object of the present invention to provide an image processing apparatus capable of checking sheet binding positions on a display before a copy operation.

The other objects and aspects of the present invention will become apparent from the following detailed description of the embodiments when read in connection with the accompanying drawings.

DETAILED DESCRIPTION OF THE PREFERRED EMBODIMENTS

Figure 1:
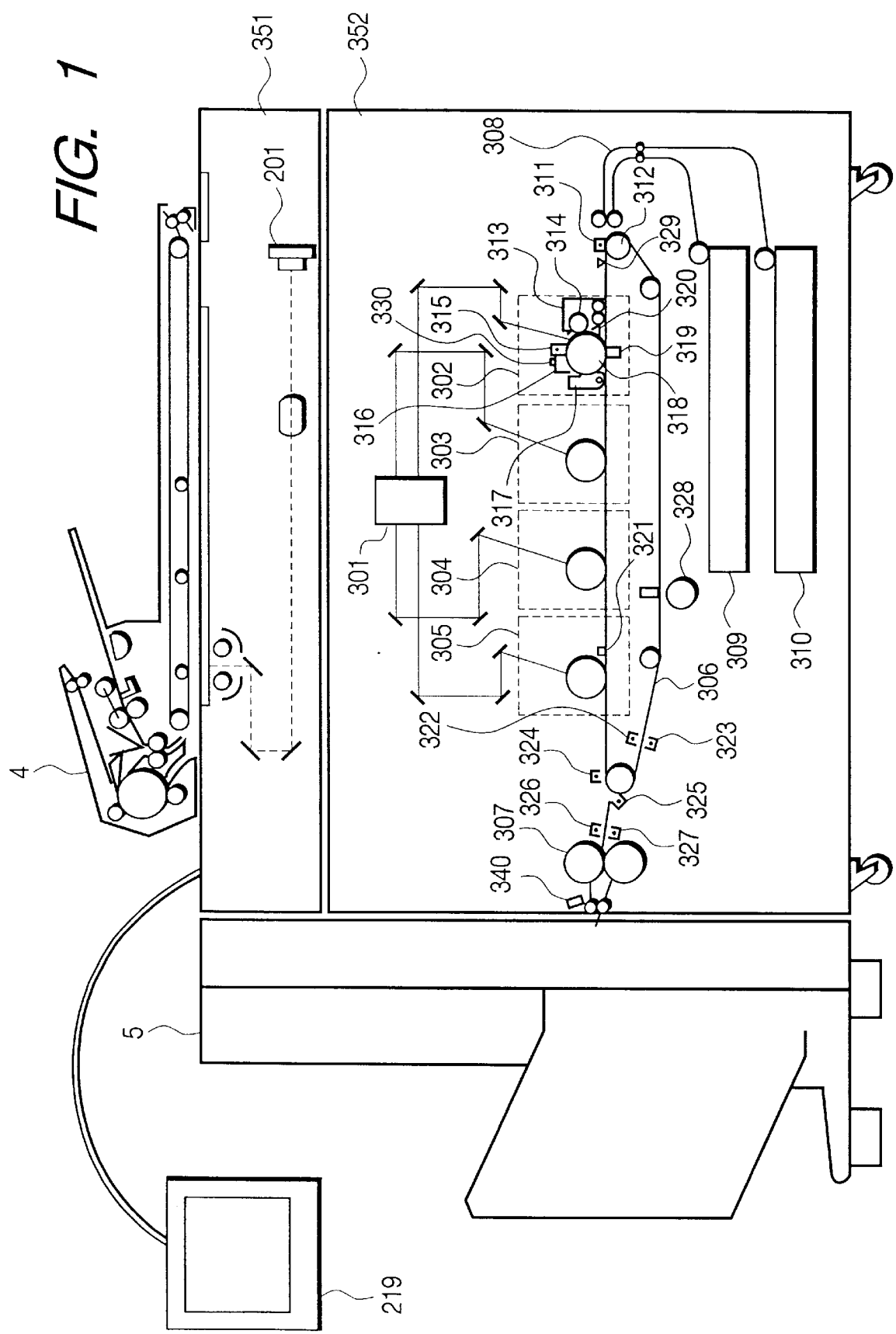
FIG. 1 is a schematic diagram in partial cross section of a color copier according to an embodiment of the invention.

FIG. 1 shows a color copier according to an embodiment of the invention. This color copier is constituted by a color reader unit 351 and a printer unit 352. The color reader unit 351 reads a color original and executes a digital editing process and the like. The printer unit 352 produces a color image in accordance with a digital image signal for each color sent from the reader unit 351. The color copier is connected to a feeder 4 for feeding an original and to a sorter 5 which sorts and folds each sheet in the order of serial page numbers and performs a binding process in accordance with a preset operation mode. The feeder 4 is mounted on the original support of the color copier as shown in FIG. 1 and sequentially feeds a plurality of originals one after another to the original support, and transports copied originals to an original stacking tray. The sorter 5 has a main body, a bin unit for stacking discharged sheets, and a stapler unit capable of fixing the sheets stacked on the bin unit, with staples at predetermined positions. Reference numeral 219 represents a display such as a CRT used for displaying a preview image and connected to the copier via a VGA interface. The display 219 may be an LCD.

Figure 2B:
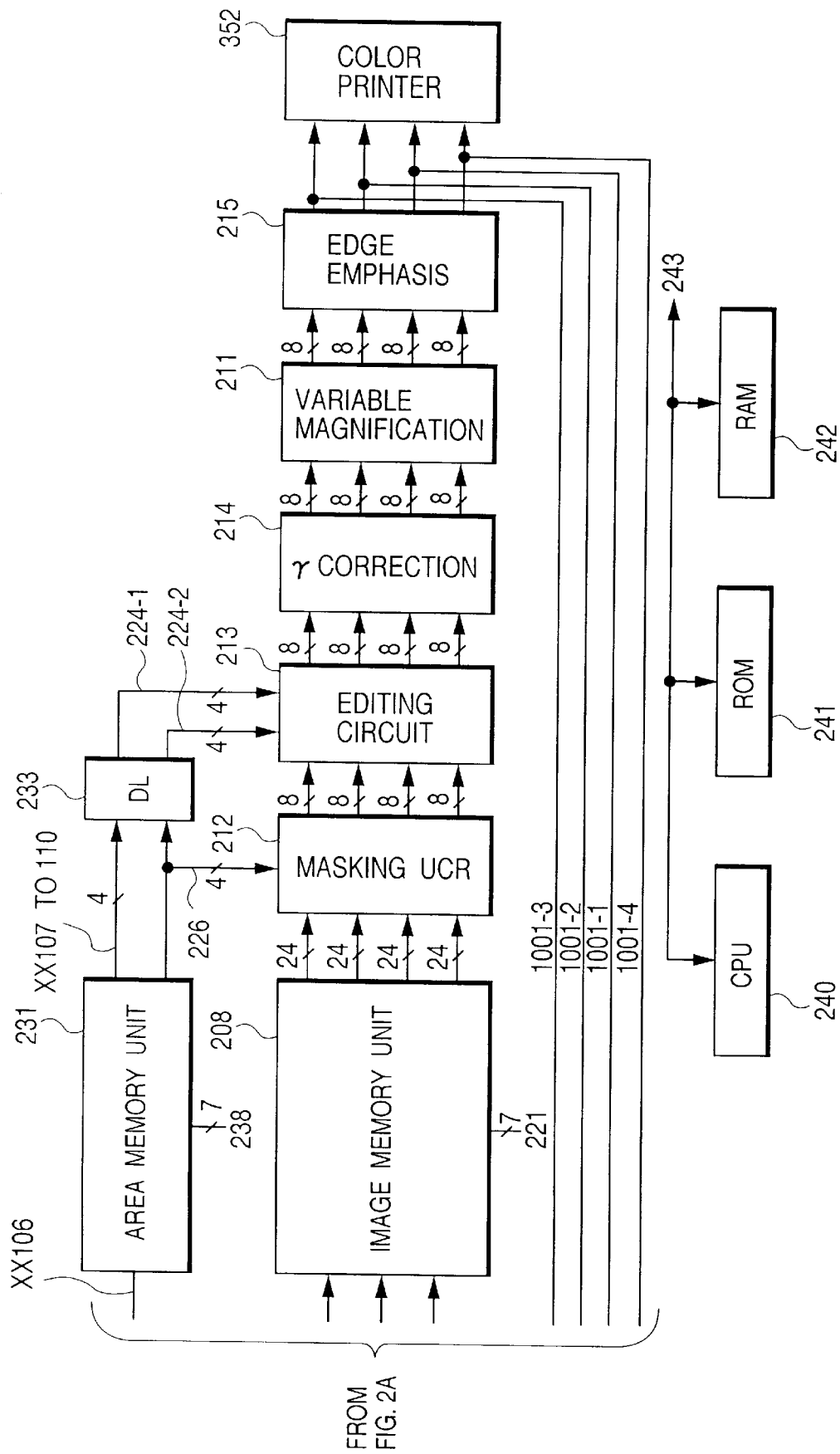
FIG. 2 is comprised of FIGS. 2A and 2B showing block diagrams of a reader unit.

FIGS. 2A and 2B are block diagrams showing a digital image processing unit of the reader unit 351. A color original placed on the unrepresented original support is exposed with an unrepresented halogen lamp. An image reflected from the original is picked up by CCD 201, output signals from which are sampled and held and thereafter converted by an A/D and S/H circuit 202 into three-color RGB digital signals. These color separated digital signals are subjected to a shading and black correction by a shading correction circuit 203, converted into an NTSC signal by a masking circuit 204, and color converted by a color conversion circuit 205 to supply the color converted signal to a synthesizing unit 206. The synthesizing unit 206 synthesizes the image data of a reflection original and the output data of an image memory 208, the synthesized result being subjected to a LOG correction process by a LOG conversion circuit 207 and to a variable magnification process (when a variable magnification is set) by a variable magnification circuit 234. The variable magnification process is actually an enlargement process because the compression process by the image memory unit 208 operates as a low-pass filter. An output of the variable magnification circuit 234 is input to the image memory unit 208.

The image memory unit 208 is constituted by three fields including a compression field, an image memory field, and an expansion field. CMYK data (24 bits×4) before an output masking process corresponding to the four color drums are read from the image memory unit 208. Compression and expansion will be later described. Reference numeral 212 represents a masking UCR unit for generating color signals for the respective drums, the color signals matching the printer characteristics. Reference numeral 213 represents an editing circuit for a free color process and a paint process. The edited result is subjected to a gamma correction by a gamma correction circuit 214, to a variable magnification process (specifically, a reduction process) by another variable magnification circuit 211, and to an edge emphasis process by an edge emphasis circuit 215, and sent to the printer unit 352.

Reference numeral 217 represents a preview processing unit which is constituted by a CRT image memory for storing edited image data and a memory control unit for controlling the CRT image memory. Reference numeral 219 represents a CRT display for displaying data in the CRT image memory. The preview processing unit 217 and memory control unit 219 will be later detailed.

Reference numeral 220 represents an area generating unit to which inputted are a signal 229 either an internally generated signal from the main scan sync signal or a BD signal 228 output from the color printer unit 352, an DTOP signal 226 output from the image front end sensor, an ITOP signal 227 generated in LBP (during printer output, and a sub scan enable signal synchronous with the rotation of each drum is generated in response to this signal). In accordance with seven signals, including two write enable signals (a main scan write enable signal 227-1 and a sub scan write enable signal 227-2) and five read enable signals (a main scan read enable signal 227-3 and sub scan read enable signals 227-M, 227-C, 227-Y, and 227-K), the area generating unit 220 outputs: a signal 221 for controlling the image memory 208; signals 238 (a main scan write enable signal 238-1, a sub scan write enable signal 238-2, a main scan read enable signal 238-3, and sub scan read enable signals 238-M, 238-C, 238-Y, and 238-K) generated synchronously with the ITOP signal 227 while considering delays at the compression and expansion fields of the image memory 208 to adjust the timings of the image signal and an area signal; and two enable signals 225 (for main scan and sub scan) for enabling a CRT image memory in the preview processing unit.

Reference numeral 230 represents a second area generating unit for generating an area signal for each editing process. As will be later described, this unit is constituted by a bit map memory and a bit map memory controller (e.g., AGDC (Advanced Graphic Display Controller)) for controlling the bit map memory. A write operation is controlled by CPU 240, whereas a read operation is performed synchronously with an HSNC signal 229 and the DTOP signal 226 synchronizing with scanning an original image. The second area generating unit 230 outputs a color conversion enable signal 222, an image synthesizing enable signal 223-2, and a free color or paint enable signal 236.

An area memory unit 231, delay circuits DL 232, DL 233, and DL 237, and another variable magnification circuit 235 operate to adjust a timing when the image signal and area signal are synchronized together. Specifically, the delay circuit DL 232 delays the output signal 223-2 by a process time required by the color conversion (and outputs a signal 223-1). For the delay circuit LD 232, a pixel delay is achieved by a D-type flip-flop and a line delay is achieved by a FIFO memory. The delay circuit DL 233 delays the output signal 226 of the area memory unit 231 by a process time required by the masking UCR and outputs a signal 224-2. For the delay circuit DL 233, a pixel delay is achieved by a D-type flip-flop and a line delay is achieved by a FIFO memory. The delay circuit DL 237 delays the output signal 236 of the area generating unit 230 by a process time required by the color conversion, image synthesis, and LOG. For the delay circuit DL 237, a pixel delay is achieved by a D-type flip-flop and a line delay is achieved by a FIFO memory. The variable magnification circuit 235 actually performs an enlargement process and is controlled in quite the same manner as the variable magnification circuit 234 (delay times are the same).

Figure 3:
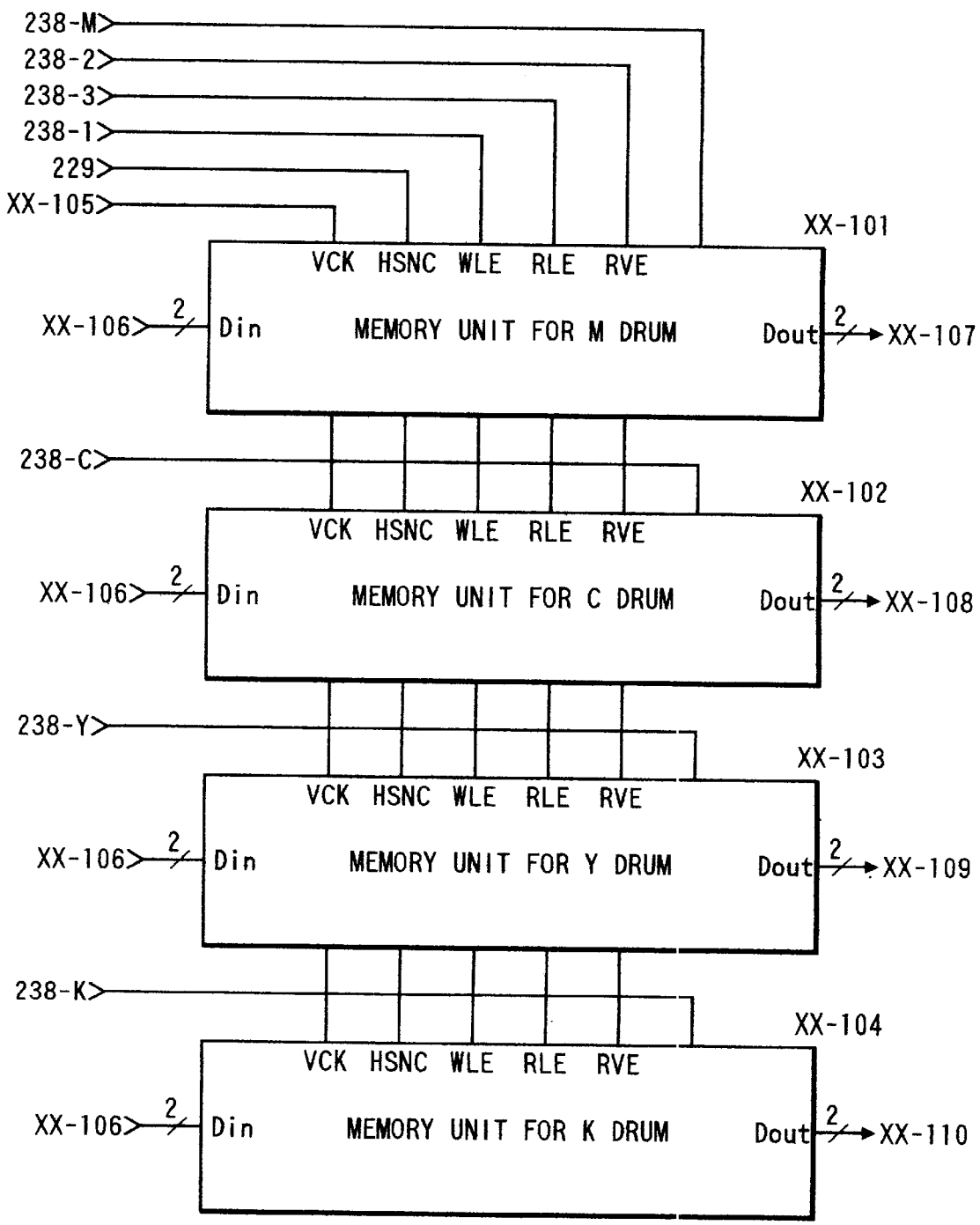
FIGS. 3 and 4 are block diagrams of a memory unit.
Figure 4:
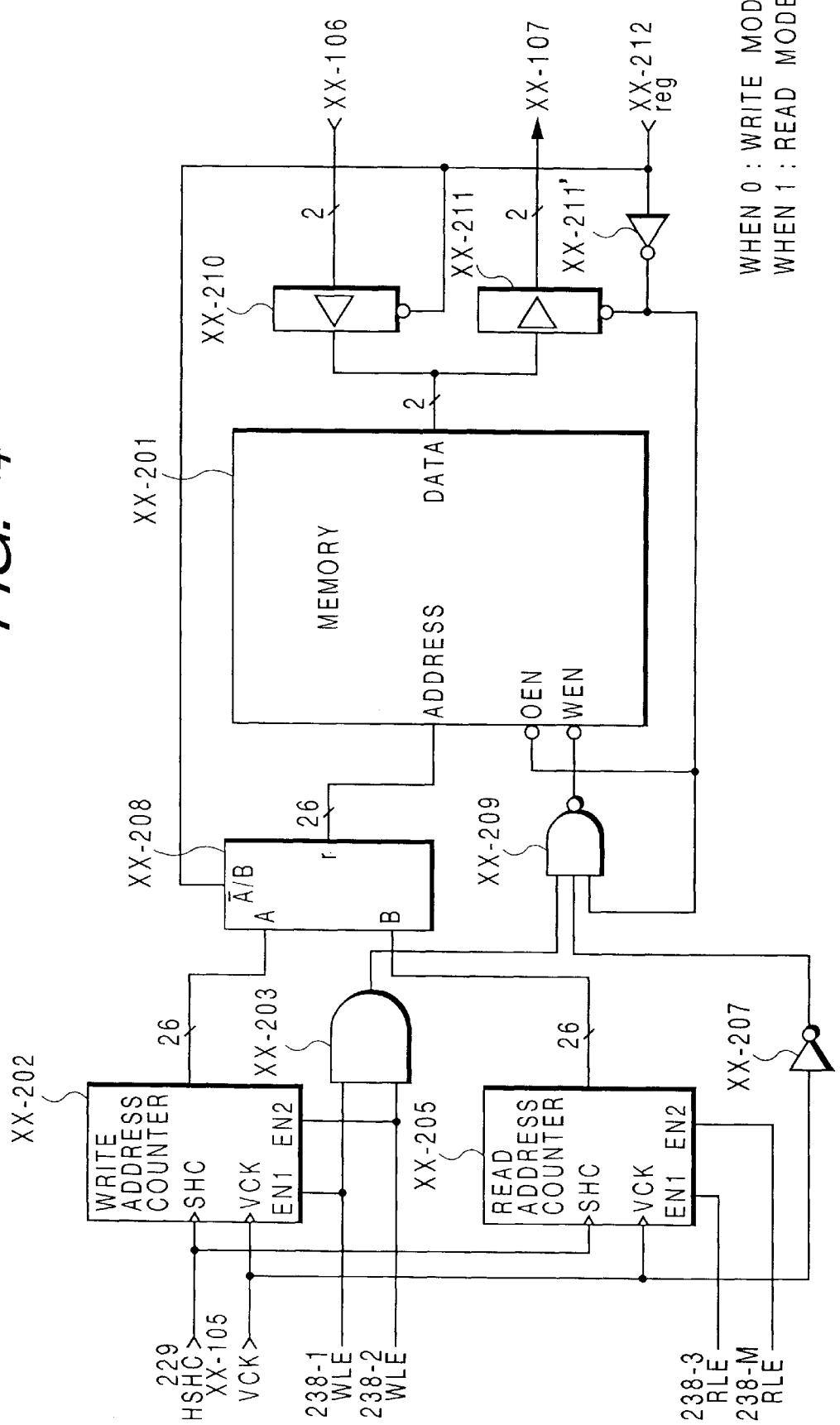

The area memory unit 231 is used for the adjustment of delays relative to the image memory unit 208. As shown in FIG. 3, the area memory unit 231 is constituted by four subsidiary memories 8-101 to 8-104 each having the same structure excepting the sub scan read enable signals 238-M to 238-K for the respective color drums. As shown in FIG. 4, each subsidiary memory is constituted by a memory XX-201, a write address counter XX-202, a read address counter XX-205, an AND gate XX-203, an inverter XX-211', buffers XX-210 and XX-211, and a register XX-212 having data designated by CPU 240. The write address counter XX-202 is constituted by a main scan counter reset by a rising edge of WLE and counted up when enabled and a sub scan counter reset by a rising edge of WVE and counted up when enabled. The read address counter XX-205 is constituted by a main scan counter reset by a rising edge of RLE and counted up when enabled and a sub scan counter reset by a rising edge of RVE and counted up when enabled. During memory write, the register XX-212 is set to "0", the write address counter is selected, the buffer XX-210 is enabled, the buffer XX-211 is disabled, OEN is set to "1", and WEN is set to "0 " at a clock falling edge, and the data in the buffer XX-210 is written in the memory XX-201. During memory read, the register XX-212 is set to "1 ", the read address counter is selected, the buffer XX-210 is disabled, the buffer XX-211 is enabled, OEN is set to "0 ", and WEN is set to "1 ", and the data in memory XX-201 is read via the buffer XX-211.

With the above configuration, area signals having different timings can be processed as in the single plane. Reference numeral 240 represents a CPU which controls a program ROM 241 and a working RAM 242 via a CPU bus 243. Each circuit described earlier is connected to the CPU bus 243 and is set with data by CPU 240 via the CPU bus 243.

<Signal Flow in Each Image Mode>

A flow of a video signal and setting an I/O port in each mode will be described with reference to FIGS. 2A and 2B.

(Normal Copy)

The flow of a video signal is 201→202→203→204→205→206 (A input C output) →207→234→208 →212 213→214→211 215→352. The sub scan read enable signals 221-(M to K) and 238-(M to K) are controlled to become enable in accordance with the distances between the respective color drums.

(Display of RGB Editing Process (Color Conversion) Result on CRT)

The flow of a video signal is 201→202→203→204→205→206 (A input→B output) →217→219. In this mode, data in the image memory unit 208 is updated each time the editing contents are modified in the preview mode so that each time the data is displayed on CRT, the original is read (the flow of a video signal is repeated starting from 201). At this time, the sub scan read enable signals 221-(M to K) and 238-(M to K) rise and fall at the same time. For printing out an image after the preview, the optical scanning is not performed but printing is performed simply by reading the data from the image memory 208. At this time, the sub scan enable signals 221-(M to K) are controlled to become enable in accordance with the distances between the respective color drums.

(Display of CMYK Editing Process (Paint, Free Color) Result on CRT)

The flow of a video signal is 201→202→203→204→205→206 (A input→C output) →207→234→208 →212→213→214→211→215→217→219. In this mode, data in the image memory unit 208 does not change with the editing contents in the preview mode so that for displaying the data on CRT at the second and following times, the optical scan is not performed but the data is displayed simply by changing the editing parameters and reading the data from the image memory 208 (the flow of a video signal starts from 208). At this time, the sub scan read enable signals 221-(M to K) and 238-(M to K) rise and fall at the same time. For printing out an image after the preview, the optical scanning is not performed but printing is performed simply by reading the data from the image memory 208. At this time, the sub scan enable signals 221-(M to K) are controlled to become enable in accordance with the distances between the respective color drums.

(Display of Synthesis Result on CRT)

(1) The flow of a video signal, when a first image is written, is 201→202→203→204→205→206 (A input →C output) →207→208.

(2) The flow of a video signal, when the first image is synthesized with a second image and the result is written in the image memory 208, is as follows.

(2-1) For memory output, the flow is 208→212→213→211→214→215→206. In this case, the data passes through the masking UCR circuit 212 without any process, and the gamma correction circuit 214 is set with a reverse LOG table.

(2-2) For a video signal from a reflection original, the flow is 201→202→203→204→205→206.

(3) The flow of an output from the synthesis circuit is 206→207→208 (memory write), and the flow to a CRT output is 208→212→213→214→211→215→217→219.

Next, the operation of setting each editing mode and printing with a preview function will be described.

Figure 5:
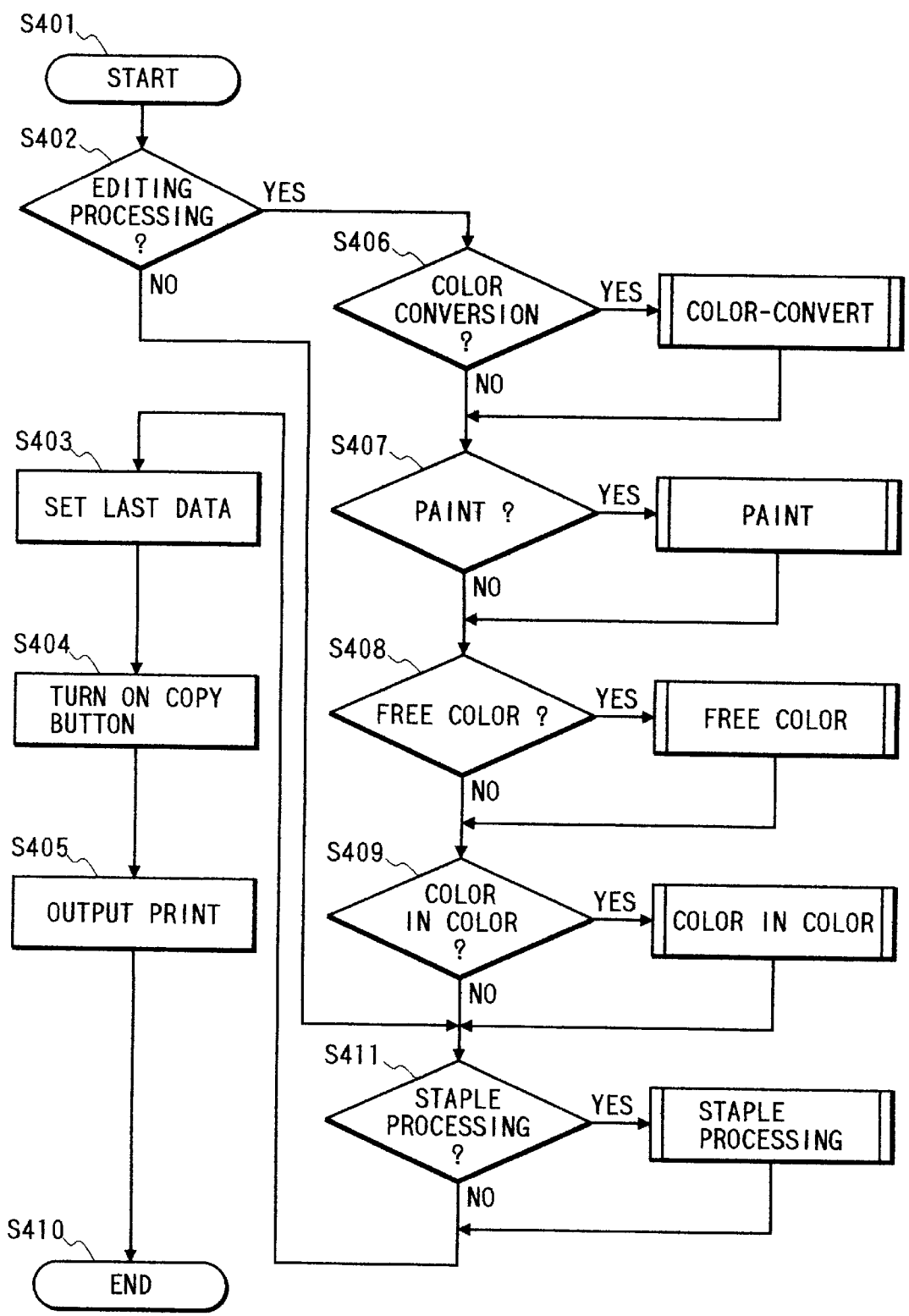
FIG. 5 is a flow chart illustrating the operation of a copy process.

The overall flow will be described with reference to FIG. 5. First, an editing process is selected from an unrepresented operation unit (S402), for example, at least one of a color conversion process (S406), a paint process (S407), a free color process (S408) and a color-in-color process (S409) is selected, and final parameters are determined using the preview function and the like. If the editing process is not selected or completed, staple processing is performed and the positions of staples are displayed on a monitor. If the operator is satisfied with the preview, parameters after editing are set (S403) and the final image is printed out (S404, S405). Being satisfied with the preview is confirmed by a key input of the operator from the operation unit.

The procedure of each image process mode will be described.

(1) Color Conversion Process

Figure 6:
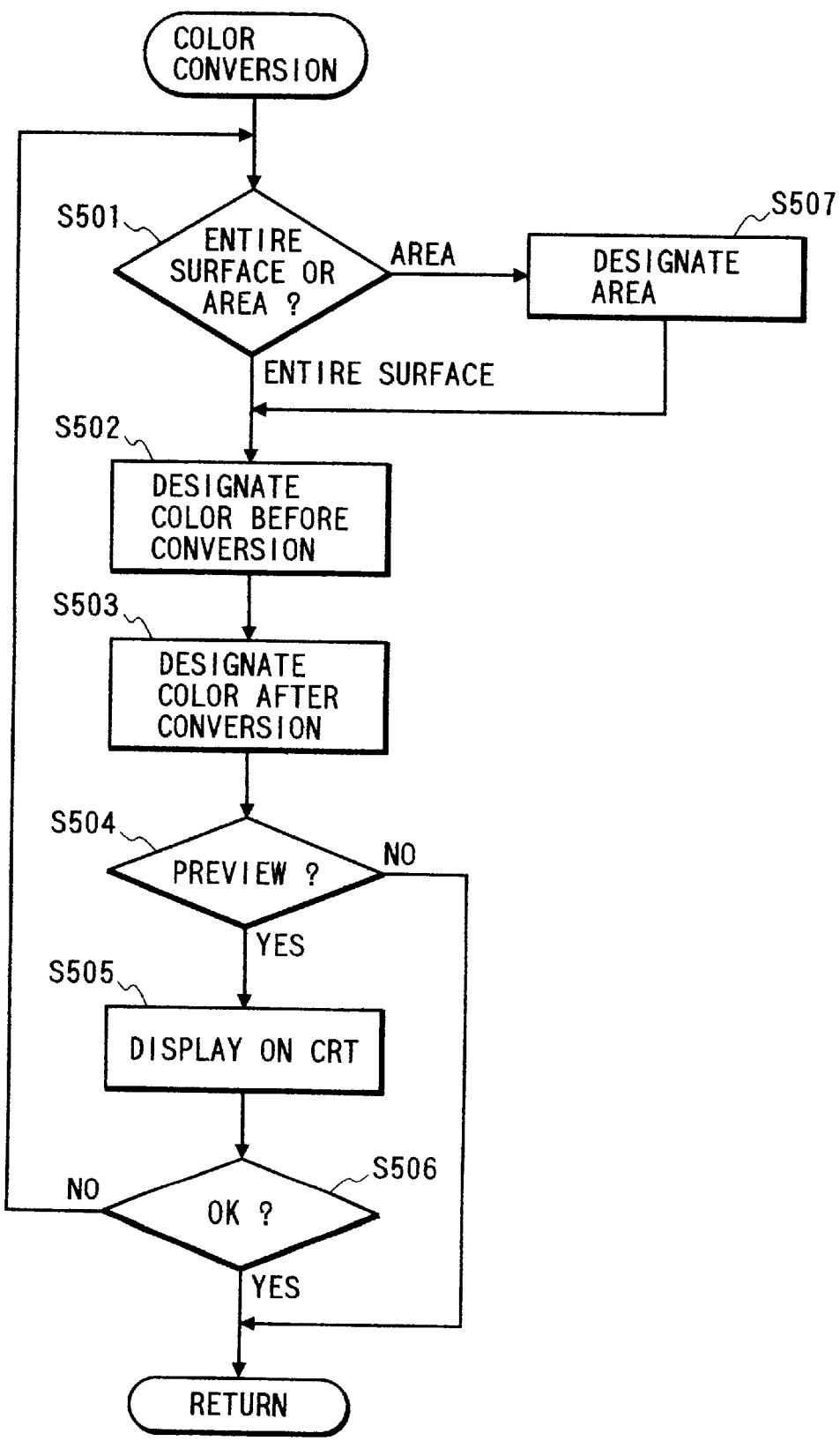
FIG. 6 is a flow chart illustrating the operation of a color conversion process.

The color conversion process will be described with reference to the flow chart of FIG. 6. For the color conversion process, either a whole surface color conversion or an area color conversion is selected (S501). If the area color conversion, an area is set, for example, by using an unrepresented digitizer (S507). Next, the color before conversion is designated (S502) and a color after conversion is designated (S503) to determine data necessary for the color conversion. When a preview function is selected at S504 (e.g., by depressing an unrepresented preview button), a reflection original placed on the original support is read and the read data is processed in the order described with the above paragraph (Display of RGB Editing Process (Color Conversion) Result on CRT) to display it on CRT at S505. If an operator is satisfied with the displayed result, another editing process is set or the final parameters area set and the final image is printed out, whereas if not satisfied, the setting is repeated until the operator is satisfied.

(2) Paint Process

Figure 7:
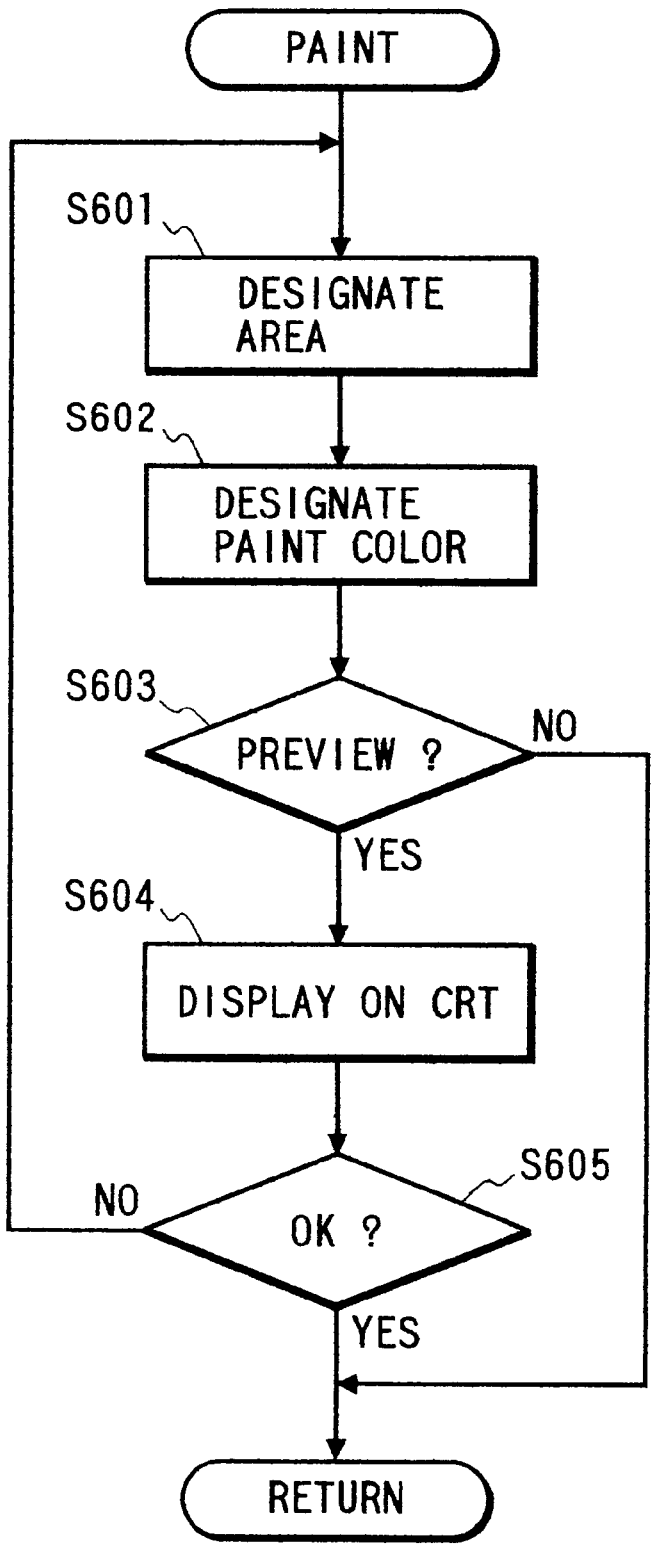
FIG. 7 is a flow chart illustrating the operation of a paint process.

The paint process will be described with reference to the flow chart of FIG. 7. For the paint process, an area is set, for example, by using an unrepresented digitizer (S601). Next, a paint color is designated at S602. When a preview function is selected at S603, a reflection original placed on the unrepresented original support is read and the read data is processed in the order described with the above paragraph (Display of CMYK Editing Process (Paint, Free Color) Result on CRT) to display it on CRT at S604. If an operator is satisfied with the displayed result, another editing process is set, or final parameters are set and the final image is printed out, whereas if not satisfied, the setting is repeated until the operator is satisfied (in the preview mode at the second or following times, data in the subsidiary memories in the image memory unit 206 is read and displayed as described earlier). In printing out, data in the subsidiary memories in the image memory unit 206 is read and printed out.

(3) Free Color Process

Figure 8:
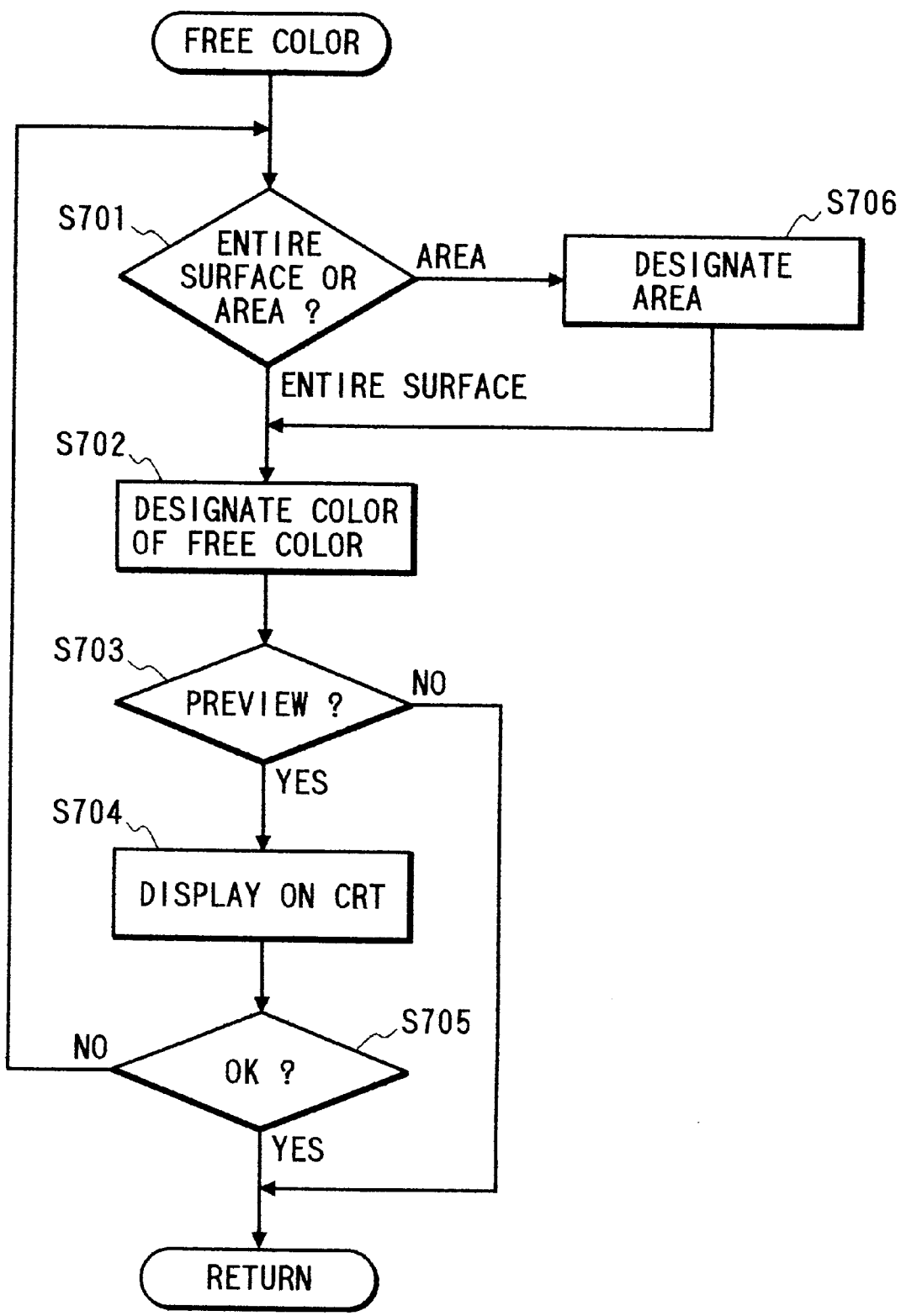
FIG. 8 is a flow chart illustrating the operation of a free color process.

The free color process will be described with reference to the flow chart of FIG. 8. For the free color process, either a whole surface mode or an area mode is selected (S701). If the area mode, an area is set, for example, by using an unrepresented digitizer (S706). At S702, a color for the free color process is designated. When a preview function is selected at S703, a reflection original placed on the unrepresented original support is read and the read data is processed in the order described with the above paragraph (Display of CMYK Editing Process (Paint, Free Color) Result on CRT) to display it on CRT at S704. If an operator is satisfied with the displayed result, another editing process is set or the final parameters are set and the final image is printed out, whereas if not satisfied, the setting is repeated until the operator is satisfied (in the preview mode at the second or following times, data in the subsidiary memories in the image memory unit 206 is read and displayed as described earlier). In printing out, data in the subsidiary memories in the image memory unit 206 is read and printed out.

<Structure of Printer>

Referring back to FIG. 1, reference numeral 301 represents a polygon scanner for scanning a laser beam on a photosensitive drum 318, reference numeral 302 represents a first stage yellow (Y) image forming unit, and reference numerals 303, 304, and 305 represent magenta (M), cyan (C), and black (K) image forming units having the same structure as the yellow image forming unit 302. The polygon scanner 301 scans the photosensitive drum 318 with a laser beam of each color radiated from a laser element independently driven for YMCK by an unrepresented laser controller unit. The polygon scanner 301 has a BD detector unit for generating a main scan sync signal by detecting the scanned laser beam. As in this embodiment, two polygon mirrors are disposed on the same axis and rotated by one motor. In this case, for example, Y and M laser beams and C and K laser beams have opposite main scan directions. Therefore, images of the Y and M image data become mirror images relative to the C and K image data in the main scan direction.

In the image forming unit 302, the photosensitive drum 318 forms a latent image through exposure to a laser beam, a developing unit 313 develops the latent image into a toner image on the photosensitive drum 318. In the developing unit 313, a sleeve 314 performs toner development by applying a developing bias. Reference numeral 315 represents a primary charger for charging the photosensitive drum 318 to a desired potential. Reference numeral 317 represents a cleaner for cleaning the surface of the drum 318 after the image transfer. Reference numeral 316 represents an auxiliary charger for discharging the surface of the drum 318 cleaned with the cleaner 317 to allow good charging by the primary charger 315. Reference numeral 330 represents a pre-exposure lamp for removing residual charges on the drum 318. Reference numeral 319 represents a transfer charger for discharging the drum from the back surface side of a transfer belt 306 to transfer the toner image on the drum 318 to a recording sheet.

Reference numerals 309 and 310 represent a cassette for accommodating recording sheets. Reference numeral 308 represents a paper feeder for feeding a recording sheet one after another from the cassettes 309 and 310. Reference numeral 311 represents a suction charger for sucking and attaching a recording sheet fed from the feeder unit to the transfer belt 306. Reference numeral 312 represents a transfer belt roller for rotating the transfer belt 306 and for sucking and attaching a recording sheet to the transfer belt 306 together with the suction charger 311.

Reference numeral 324 represents a discharger used for making a recording sheet easy to be separated from the transfer belt 306. Reference numeral 325 represents a charger used for eliminating an image disturbance to be caused by discharge when a recording sheet is separated from the transfer belt. Reference numerals 326 and 327 represent a pre-fixation charger used for eliminating an image disturbance for supplementing a suction force of the toner on the recording sheet after separation. Reference numerals 322 and 323 represent a transfer belt discharger for discharging the transfer belt 306 to electrostatically initialize it. Reference numeral 328 represents a belt cleaner for removing stains or dusts on the transfer belt 306. Reference numeral 307 represents a thermal fixing unit for thermally fixing a toner image charged again by the pre-fixation chargers 326 and 327 on a recording sheet. Reference numeral 340 represents a paper discharge sensor for detecting a recording sheet on a transport path along the fixing unit. Reference numeral 329 represents a paper front end of a recording sheet fed by the feeder unit 308 to the transfer belt. A detection signal of the paper front end is supplied from the printer unit 352 to the reader unit 351 and used for generating a sub scan sync signal which is used for the transmission of a video signal from the reader unit to the printer unit. The reader unit and each block will be described below in the order of the preview processing unit, color conversion, and paint—free color.

<Description of Preview Processing Unit>

Figure 9:
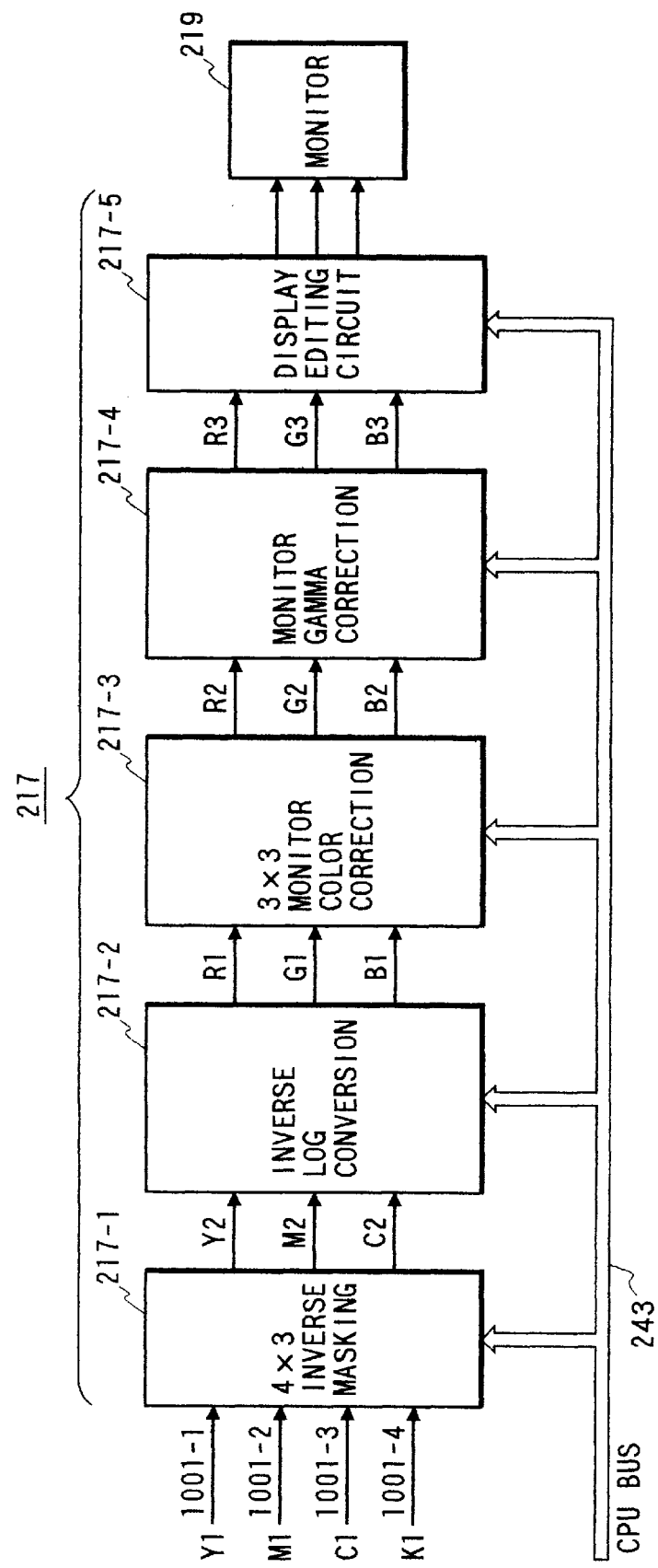
FIG. 9 is a block diagram of a preview processing unit.

FIG. 9 is a block diagram of a preview processing circuit 217 for processing read image data at all the processing circuits and displaying the final image on CRT 219.

Final image data Y1, M1, C1, and K1 1001-1 to 1001-4 (8 bits of each set of YMCK data) are input first to a 4×3 reverse masking correction circuit 217-1 to execute the following calculations which are reverse calculations of the masking UCR circuit 212 shown in FIGS. 2A and 2B.

$$Y2 = a11 \times Y1 + a12 \times M1 + a13 \times C1 + a14 + K1$$

$$M2 = a21 \times Y1 + a22 \times M1 + a23 \times C1 + a24 + K1$$

$$C2 = a31 \times Y1 + a32 \times M1 + a33 \times C1 + a34 + K1$$

Arbitrary coefficients all to a34 can be set by CPU 240 via the CPU bus 243. The four-color information is converted into three-color information Y2, M2, and C2 which are input to a reverse logarithm conversion correction circuit 217-2. This correction circuit 217-2 is constituted by a LUT used for performing reverse calculations of the LOG circuit 207 shown in FIGS. 2A and 2B. Similar to the above, arbitrary correction data can be set by CPU. With these calculations, the YMCK density data is converted into luminance data for allowing to display it on CRT. There are many types of CRTs having various color reproduction characteristics. Therefore, means for matching the characteristics of CRT is necessary. A 3×3 monitor color correction circuit 217-3 corrects the luminance data to match the monitor color characteristics and executes the following calculations.

$$R2 = b11 \times R1 + b12 \times G1 + b13 \times B1$$

$$G2 = b21 \times R1 + b22 \times G1 + b23 \times B1$$

$$B2 = b31 \times R1 + b22 \times G1 + b33 \times B1$$

Figure 10:
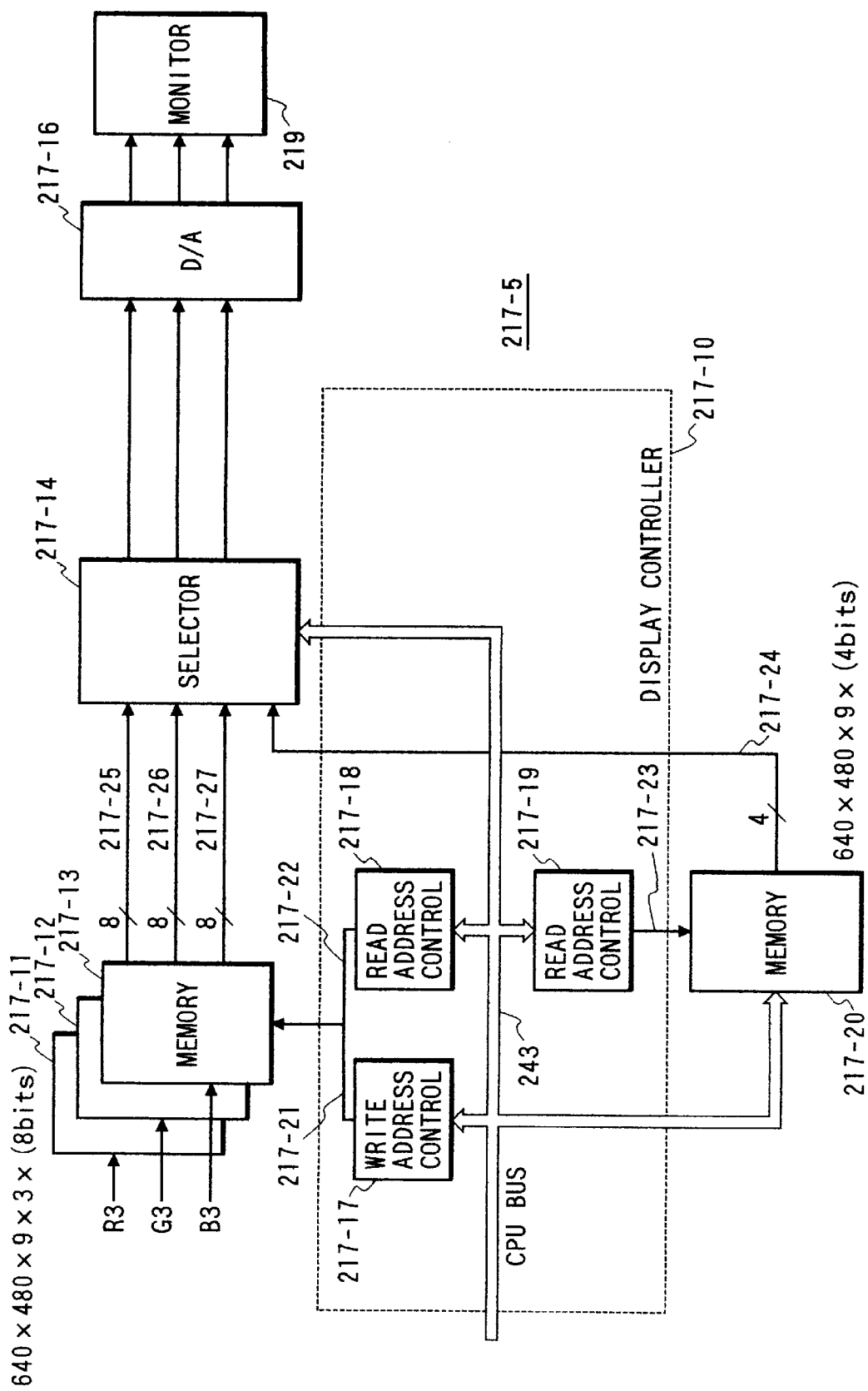
FIG. 10 is a block diagram of a display editing circuit.

Arbitrary coefficients can be set by CPU 240 like the reverse masking circuit 217-1. A monitor gamma correction circuit 217-4 corrects the luminance data to match the gamma characteristics of a monitor, and arbitrary correction data can be set by CPU 240. A display editing circuit 217-5 performs various editing processes for the image data displayed on the monitor and controls the monitor. FIG. 10 shows the details of the display editing circuit which is roughly divided into a read image processing section and an additional information adding section for adding a frame, character, or the like to the image.

R3, G3, and B3 data after the monitor gamma correction by the monitor gamma correction circuit 217-4 are supplied to memories 217-11, 217-12, and 217-13. Start and end addresses in X and Y directions can be set via the CPU bus 243 to a writing address control circuit 217-17 of a display controller 217-10 which supplies an address signal 217-21 so that data can be written starting from a desired location of each memory. In this embodiment, the memory size of each color is 640×480×9×(8 bits).

The original image size can be reduced when the image data is stored in the memory, the magnification factor being set by CPU 240. In accordance with whether the image is horizontally or vertically long, the writing address control circuit 217-17 can operate to rotate the image as desired. In this case, the area outside of the start and end addresses, i.e., the area where an image is not written, has the previous image or the fixed display color. Therefore, in this embodiment, CPU 240 can control to display the area other than the writing area with a desired color.

CPU can set arbitrary coordinate values to a reading address control circuit 217-18 to read the image data in the memory at desired locations and display it on the monitor. This designation can be performed in real time, by using a touch panel key of the operation unit to be described later. Since the image size of the monitor of this embodiment is 640×480 dots, it is necessary to thin the image in order to display the whole image stored in the memory. A thinning factor can be set by CPU. In this embodiment, as will be later described, an operator can select one of a full mode of displaying the whole image stored in the memory, a twofold mode of displaying ⅘ the image stored in the memory, and a threefold mode of displaying ⅑ the image stored in the memory.

A memory 217-20 is used for adding information such as figures and characters to the image and has a size of 640×480×9×(4 bits) which allows to independently develop figures and characters of four frames.

In this embodiment, although the data is developed directly on the memory by CPU 240, it may be developed by a dedicated controller capable of developing data at high speed, such as AGDC (manufactured by NEC CORP.). The reading address control circuit 217-19 can set a reading start location and a thinning factor, similar to the reading address control circuit 217-18.

The data read from the memories is input to a selector 217-14. If a signal 217-24 read from the memory 217-20 is "L", the selector outputs the image data itself 217-25 to 217-27, and if the signal is "H", it outputs R, G, and B (8 bits) data of four frames. These R, G, and B data can be set by CPU 240 and a desired color is given to the figures and characters in each of the four fields. The signal output from the selector 217-14 is converted into an analog signal by a D/A converter 217-16 to display a final image on a monitor 219.

<Staple Processing>

Figure 11:
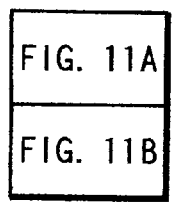
FIG. 11 is comprised of FIGS. 11A and 11B showing flow charts illustrating the operation of a stapling process
Figure 11A:
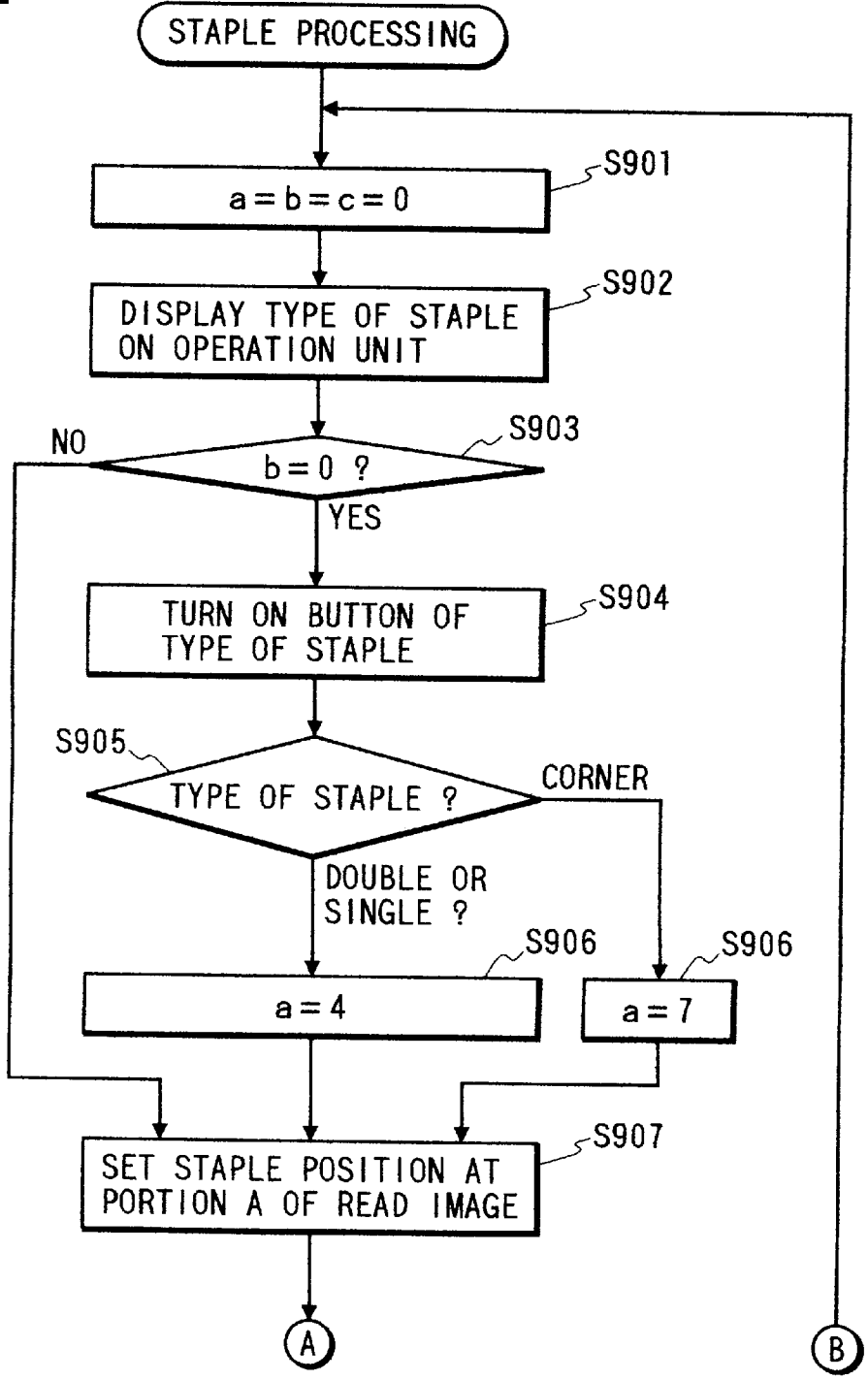
Figure 11B:
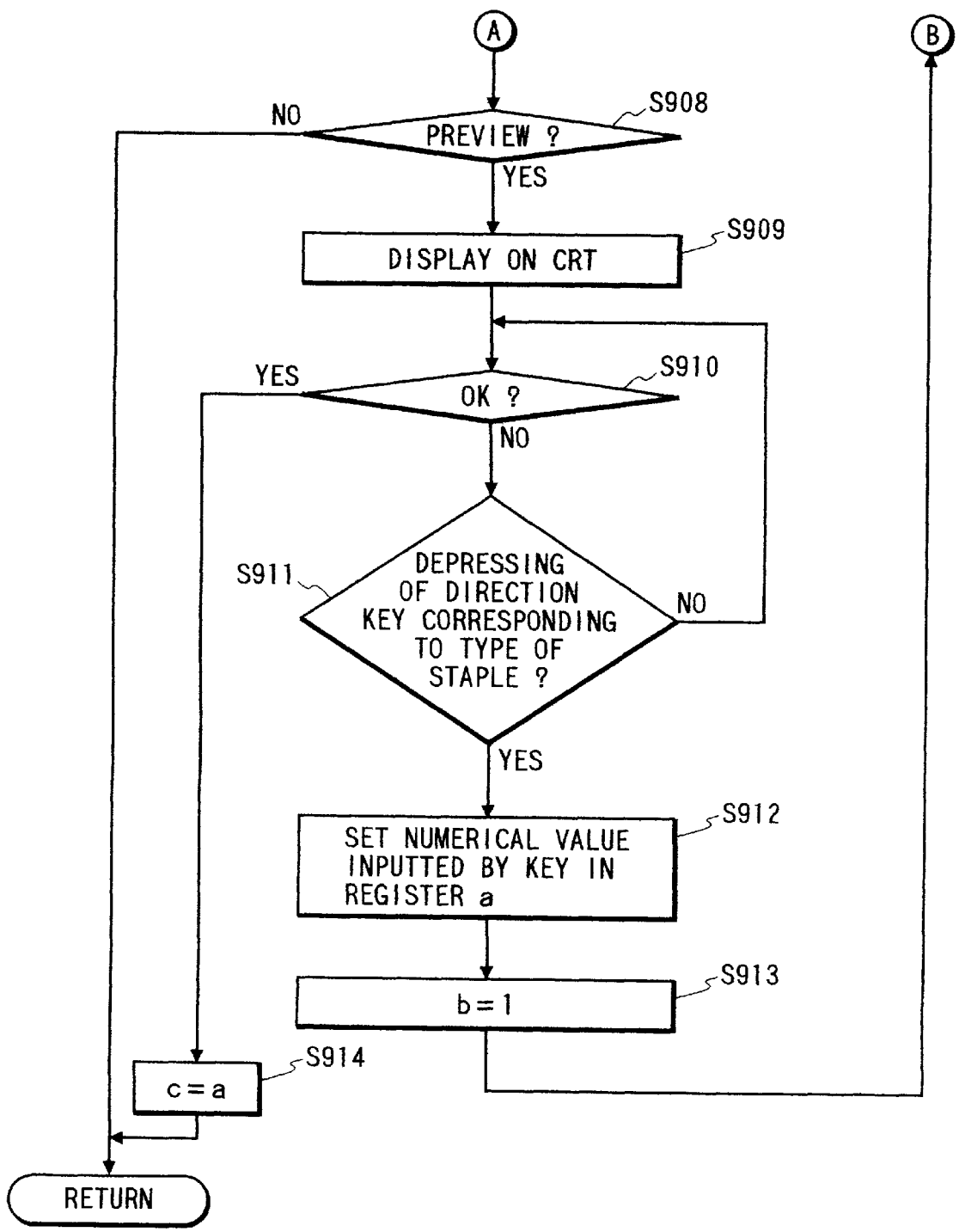
Figure 12:
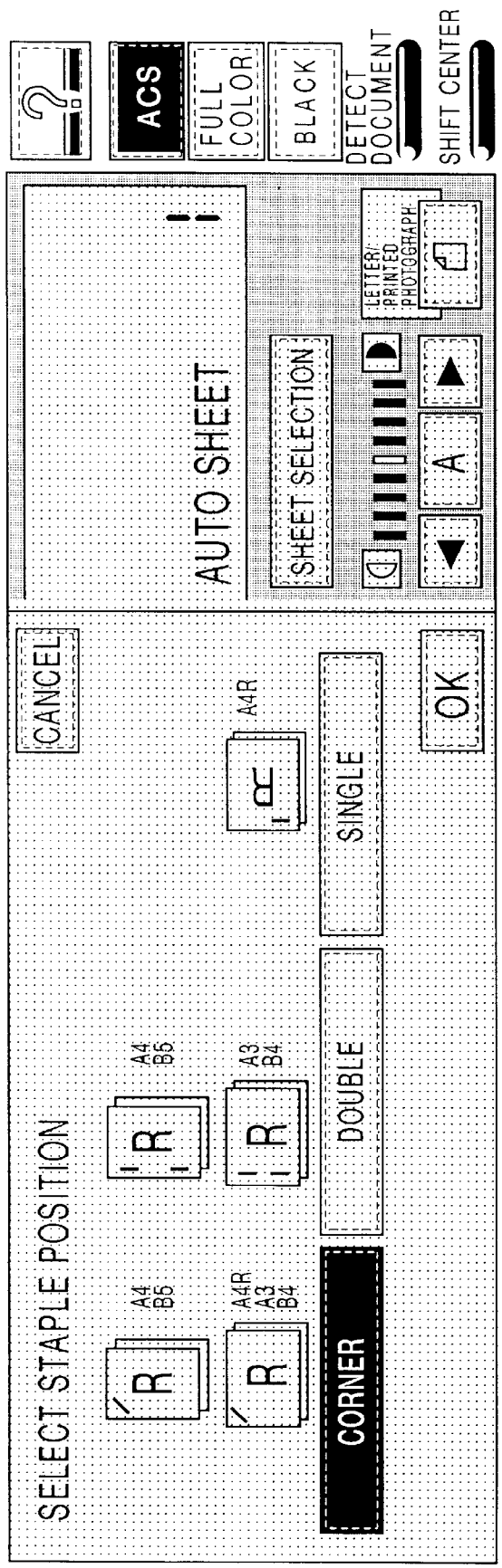
FIG. 12 is a diagram showing a display example on an operation unit.

The staple processing will be descried with reference to the flow chart shown in FIGS. 11A and 11B. In the staple processing, CPU 240 initializes unrepresented registers a, b, and c (S901). Next, as shown in FIG. 12, the types of staples are displayed on the operation unit (S902). If the staple processing is the first setting (b=0), the register a is set (S904 to S906) in accordance with the type of the selected staple (in this embodiment, the type includes a corner, a double, and a single). The register a indicates the position of the selected staple, and is set with "4" if the double or single type is selected (left end of a preview image). Similarly, if the corner type is selected, "7" is set to the register a (in this example, numerals set to the register a indicate as follows: 1: lower left end, 2: lower end, 3: lower right end, 4: left end, 6: right end, 7: upper left, 8: upper end, 9: upper right end). The register b functions as a flag indicating whether or not the staple position was changed by using a direction key (0: no change, 1: change).

Figure 19:
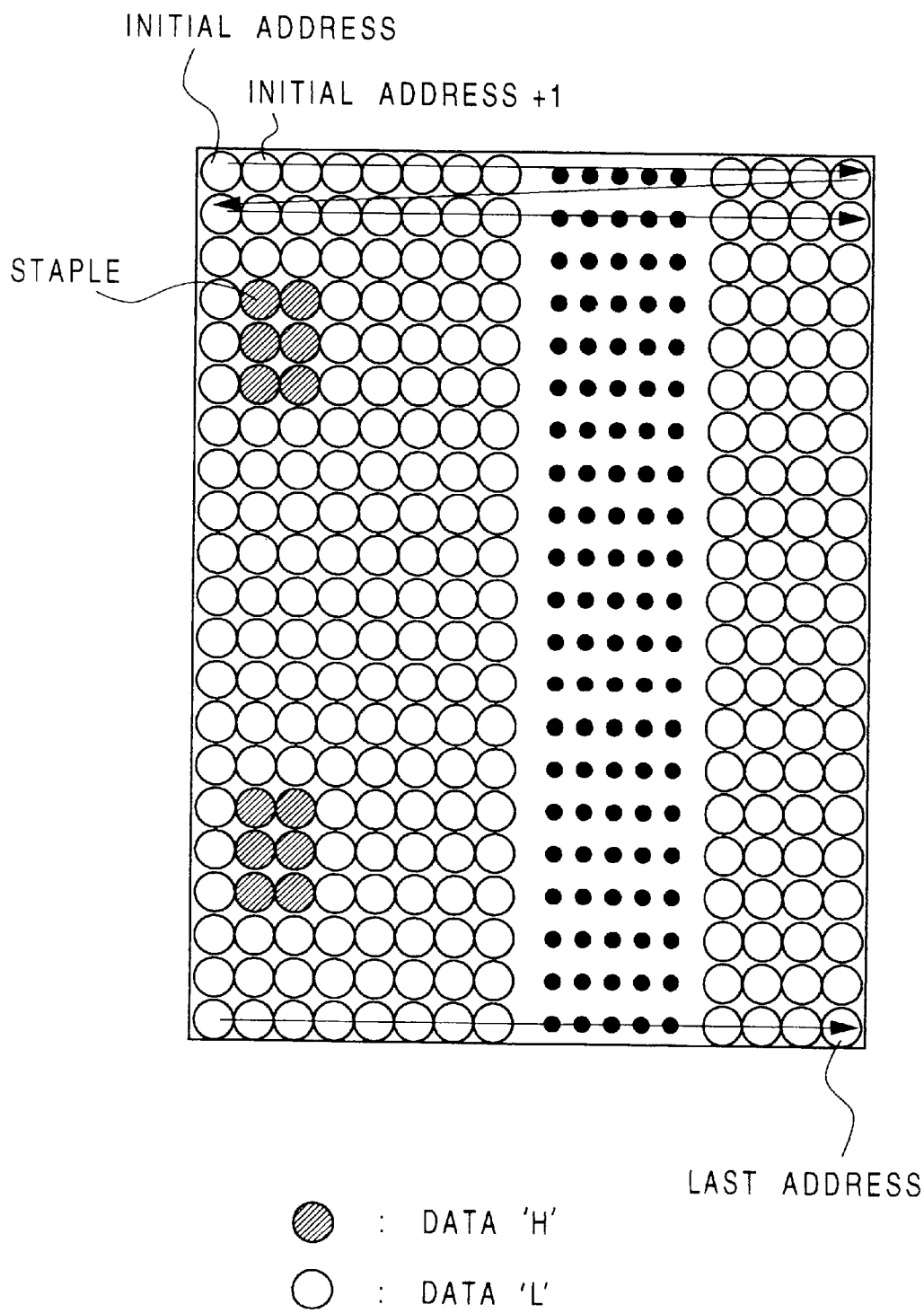
Figure 20:
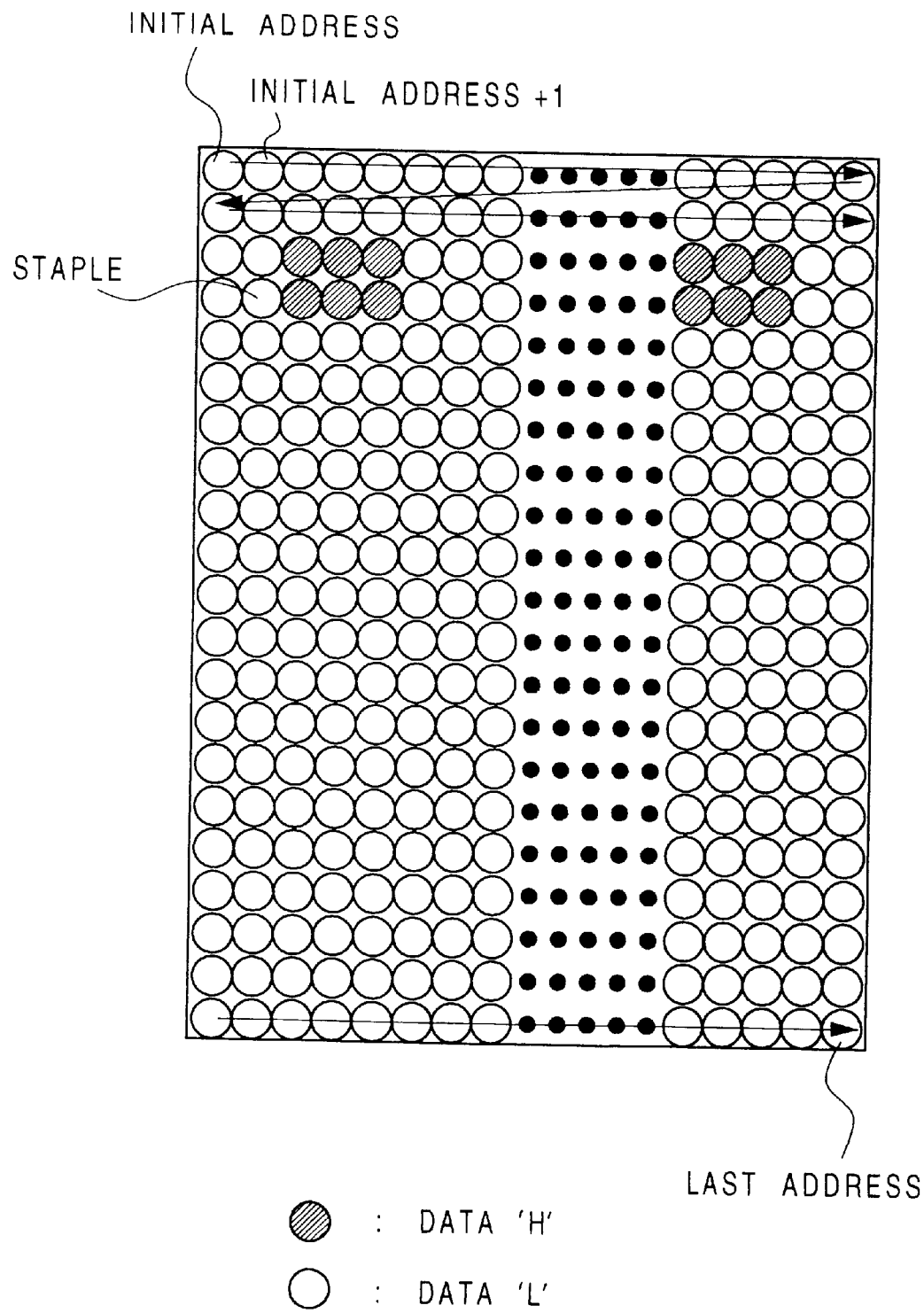

In this manner, the staple position indicated by the register a is set to the read image (S907). As a preview is selected at S908, a preview image is displayed on CRT (S909). For example, if the double is selected at S905, data such as shown in FIG. 19 is written in the memory 217-20 shown in FIG. 10. The written data is sequentially read starting from the initial address and added via the selector 217-14 shown in FIG. 10 to a read image or edited image to display the results on CRT. If the operator is satisfied with the displayed image (S910), the staple processing is terminated. If not satisfied, the operator depresses the direction key to change the staple position (S911) and set the register a again (S912). The register b is set with "1" indicating a change, and the flow returns to S902. Since b=1 at S903, the staple position indicated by the register a set at S912 is set again at S907. If the register a is set with "8" (upper end), data such as shown in FIG. 20 written in advance in the memory 217-20 is sequentially read starting from the initial address. If "6" (right end) is set, data such as shown in FIG. 19 is sequentially read in the reverse order starting from the end address. If "2" (lower end) is set, data such as shown in FIG. 20 is sequentially read in the reverse order starting from the end address. In the above manner, an original image and a staple position are displayed on CRT 219. If the operator is satisfied with the staple position on the preview image, the final value of the register a is set to the register c (S914) and a rotation process is executed in accordance with the value of the register c. Namely, if c=4, 7, then the image is rotated by 0° (no rotation),
if c=8, 9, then the image is rotated by -9°,
if c=6, 3, 180°, then the image is rotated by 180°, and
if c=2, 1, then the image is rotated by 90°, where a positive angle means the clockwise direction and the negative angle means the counter-clockwise direction. After this rotation process is performed on the image memory unit 208 shown in FIGS. 2A and 2B, the image is printed out. The stapler is mounted on the sorter 5 shown in FIG. 1 between the front right side to the back right side. Since the stapler cannot be mounted at the left or middle side of the sorter, the image is rotated to set a desired staple position.

<Rotation Process>

Next, the rotation process at the image memory unit 208 will be described. The image memory unit has three fields including a compression field, a memory field, and an expansion field. In the following, the rotation process at the memory field will be described.

Figure 13:
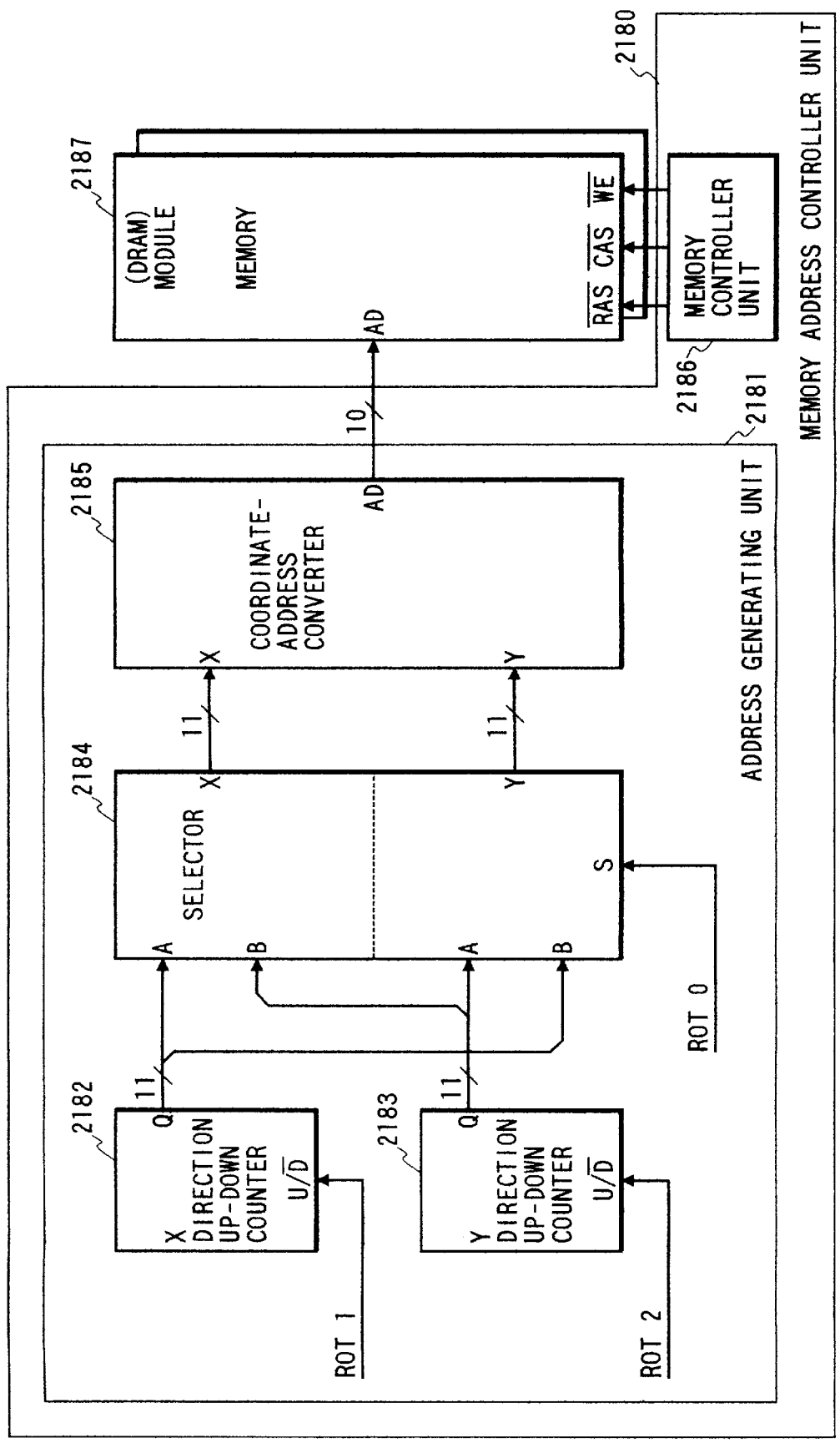
FIG. 13 is a block diagram of the memory unit.

As shown in FIG. 13, a memory address controller unit 2180 is constituted by an address generating unit 2181 and a memory controller unit 2186 which generates RAS, CAS, and WE signals (all active low signals). The address generating unit 2181 is constituted by a main scan direction (X-direction) up/down counter 2182, a sub scan direction (Y-direction) up/down counter 2183, a selector 2184 for selecting one of the outputs of the up/down counters, and a coordinate-address converter 2185 for converting the output of the counter into the address of the memory 2187 (a DRAM in this example, other memories may be used). ROT0 is a select signal of the selector 2184, ROT1 and ROT2 are a switching signal between up/down counts of the X and Y up/down counters. With these three bit signals, eight types of images shown in FIGS. 14A to 14H can be output.

Figure 14A:
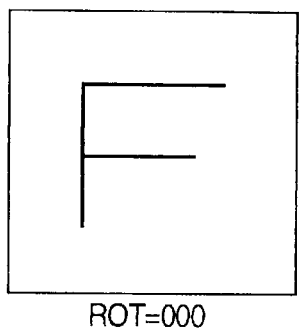
FIGS. 14A to 14H are diagrams illustrating the operation of a rotation process.
Figure 14B:
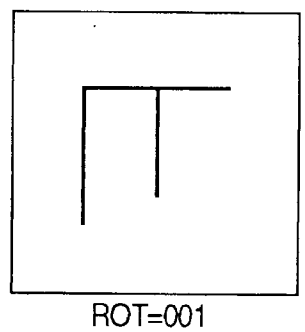
Figure 14C:
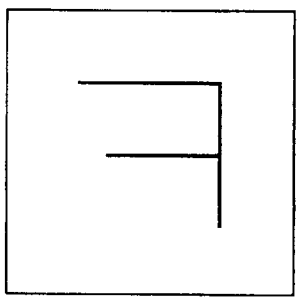
Figure 14D:
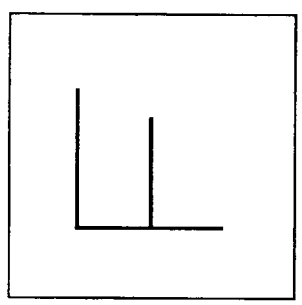
Figure 14E:
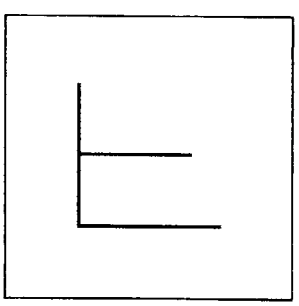
Figure 14F:
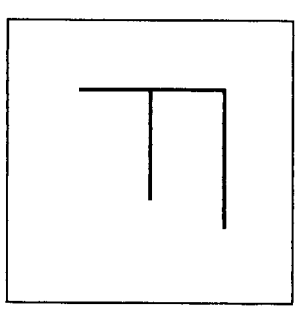
Figure 14G:
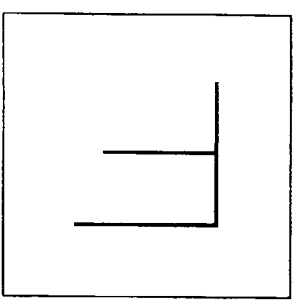
Figure 14H:
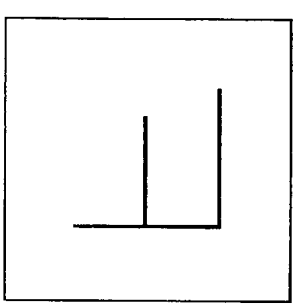

Specifically, according to the value of the register c, the following images can be printed out being rotated by a desired angle by designating the memory address:

An image of FIG. 14A is printed out for c=4, 7, and (ROT2, ROT1, ROT0)=(0, 0, 0);

an image of FIG. 14D is printed out for c=8, 9, and (ROT2, ROT1, ROT0)=(0, 1, 1);

an image of FIG. 14G is printed out for c=6, 3, and (ROT2, ROT1, ROT0)=(1, 1, 0); and an image of FIG. 14F is printed out for c=2, 1, and (ROT2, ROT1, ROT0)=(1, 0, 1).

<Operation Unit>

Figure 15:
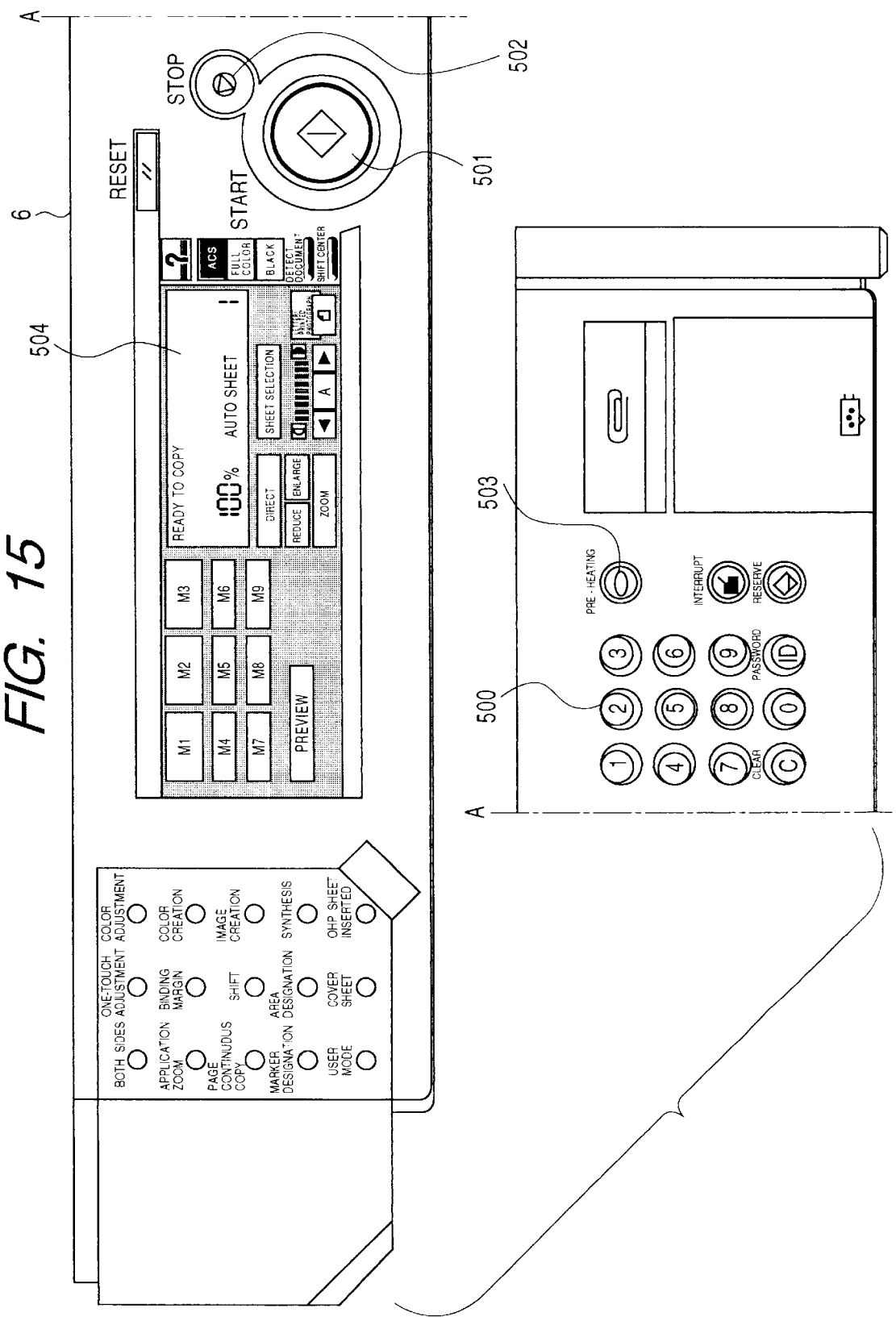
FIG. 15 is a diagram showing the operation unit.

FIG. 15 shows an outer appearance of the operation unit 6. Reference numeral 500 represents numerical keys, reference numeral 501 represents a copy start key, reference numeral 502 represents a stop key, reference numeral 503 represents a remaining heat key, and reference numeral 504 represents a display unit such as a liquid crystal display.

Figure 16:
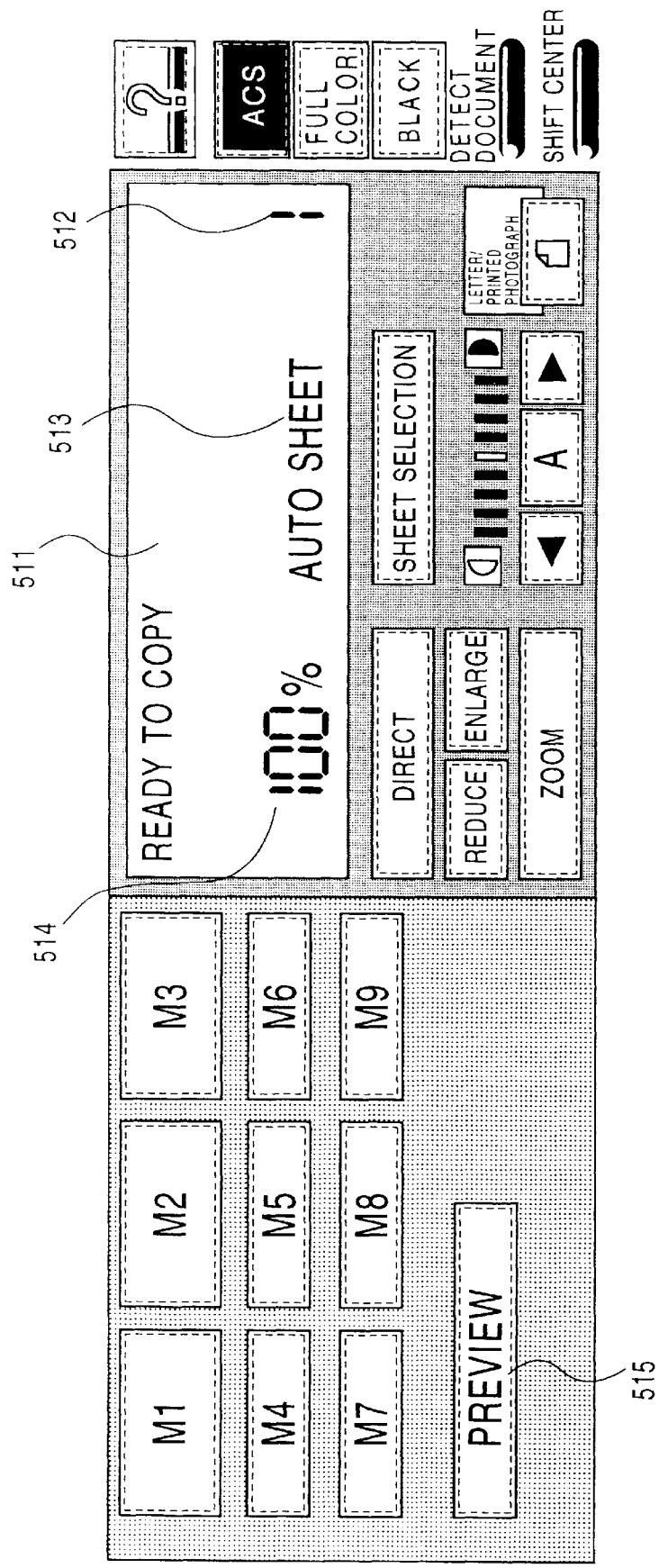
FIGS. 16 and 17 are diagrams showing display examples on the operation unit.

A standard screen on the display unit 504 is shown in FIG. 16.

Figure 17:
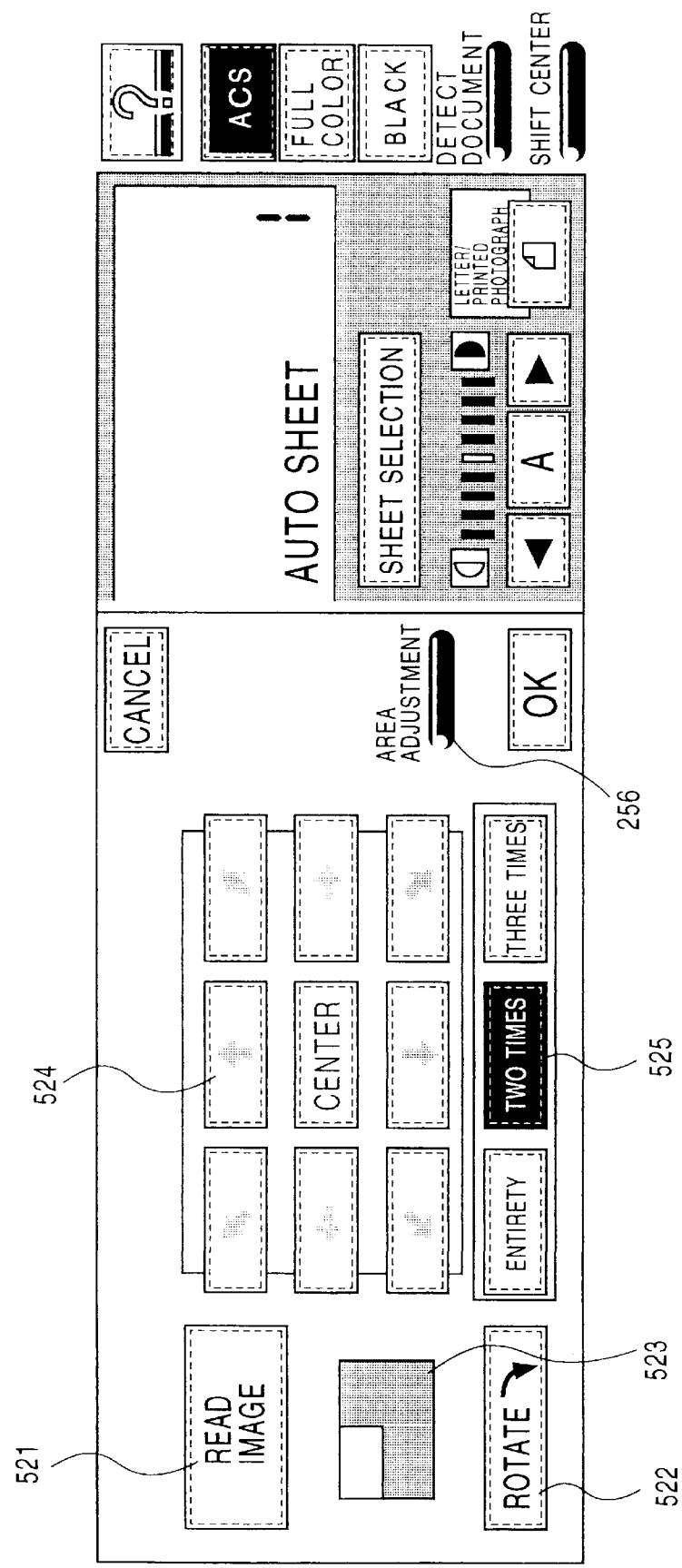

In the standard screen shown in FIG. 16, reference numeral 511 represents a display of whether a copy is ready or not. Reference numeral 512 represents a display of the set number of copies, reference numeral 513 represents a display of a selected paper size, and reference numeral 514 represents a display of a copy magnification. Reference numeral 515 represents a touch key for designating a preview mode. Prior to starting the preview mode, an operator designates from the operation unit, an image magnification, a paper size, and an editing process, and depresses a preview mode key 515. The screen on the display unit changes from the standard screen to a preview operation screen. FIG. 17 shows an example of the preview operation screen. Reference numeral 521 represents a preview start key, reference numeral 522 represents display direction setting keys, reference numeral 523 represents an area monitor, reference numeral 524 represents display position setting keys, reference numeral 525 represents display magnification setting keys, and reference numeral 526 represents an area adjusting key. An operator first sets an original on an original support or feeder 4 and the display direction (vertical or horizontal) of the original is set with the display direction setting key 522. With the ordinary display direction, the original image starting from the original abutting position of the original support is displayed at the upper right of CRT 219. As the display direction setting key 522 is depressed, the display of the display direction setting key is changed between white and black, and the image rotated by 90 degrees is written in the display memories 217-11 to 217-13. Therefore, the original image rotated by 90 degrees relative to the original abutting position of the original support is displayed on CRT 219.

When the operator depresses the preview start key 521, the original is transported from the feeder to the original support if the original is set to the feeder 4, and if a pre-scan is set, the original size on the original support is detected. Thereafter, a scan operation starts reading the original. The read image is subjected to various editing processes and supplied to the preview processing unit 217 whereat it is converted into RGB signals and written in the image memories 217-11 to 217-13 by calculating the most efficient size allowing the whole image to be stored therein, in accordance with the set display direction, display magnification, original size, and the like. The data in the image memories 217-11 to 217-13 is corrected by a monitor gamma correction unit 217-4 in accordance with the CRT characteristics and transferred to the display controller 217-10 to display a preview image on CRT.

The capacity of each image memory 217-11 to 217-13 is 1920×1440 pixels which is nine times as large as the size of 640×480 pixels of CRT. Therefore, when the data is transferred from the image memories to CRT, it is necessary for the display controller 217-10 to change the size of the data in the image memories 217-11 to 217-13 in accordance with the display size of CRT and the display magnification set with the display magnification setting key 525.

Figure 18:
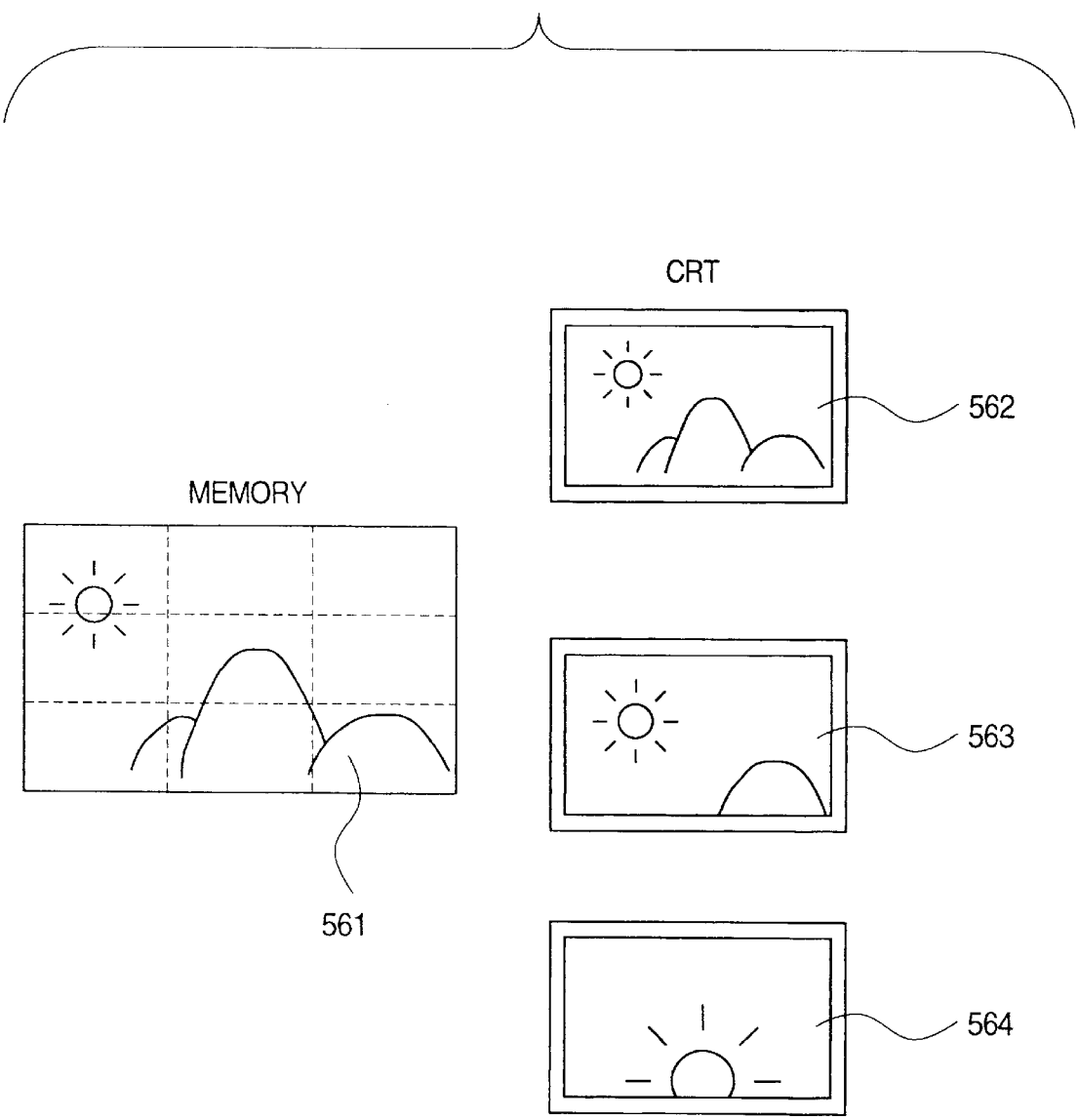
FIGS. 18 to 20 are diagrams showing examples of preview images.

Specific examples are shown in FIG. 18. Data indicated at 561 is being stored in the image memories 217-11 to 217-13. If the "whole" key among the display magnification keys is set, the whole data area in the image memories 217-11 to 217-13 is reduced by ⅓ by the display controller 217-10 and displayed on CRT as indicated at 562. If the "two times (twofold)" key is depressed, the data in a 4/9 area of the whole area in the image memories 217-11 to 217-13 is reduced by ¼ by the display controller 217-10 and displayed on CRT as indicated at 563. Namely, the data in a partial area in the image memories 217-11 to 217-13 is enlarged by two times as compared to the display of the whole area. Similarly, if the "three times (threefold)" key is depressed, the data in a ⅑ area of the whole area in the image memories 217-11 to 217-13 is directly transferred to display it on CRT as indicated at 564, this image in the ⅑ area being enlarged by three times as compared to the display of the whole area.

If the twofold or threefold is set with the display magnification setting key, part of the data in the image memories 217-11 to 217-13 is displayed on CRT. In this case, if the reading address is changed and the data is transferred to CRT, the area not displayed before can be displayed. Specifically, in the case of the twofold set with the display magnification setting key, an arbitrary image corresponding to the ¼ area in the image memories is displayed on CRT. In this case, each time the downward arrow key among the display position setting keys 524 is depressed, the reading start position of the image memories move downward by four dots and the image in the ¼ area from the reading start position is transferred to CRT. Therefore, the image at the lower area of the screen not displayed before can be displayed. If the image read from the memories contains one side edge of the whole image and the reading start position is moved to this side edge at the next time, the image is outside of the image memories. Therefore, in order to notify the operator of that the image cannot be moved to this side, the display position setting key toward this side is displayed with cross hatching. In order to notify the operator of the partial area displayed on CRT, this area is displayed on the area monitor 523.

After the staple position and original image satisfying the operator are displayed on CRT, the start key 501 is depressed to print out the image from the printer unit 352.

In the above embodiment, a color copier and a display unit are used. Instead, a color copier and a personal computer connected thereto may be used. In this case, an original image read by the reader unit is supplied to the personal computer and displayed on a display screen of the computer. The staple position is designated from a keyboard or mouse of the computer to display a mark indicating the staple position. After the staple position is determined, the staple position information and original image are sent to the printer unit to print out, and thereafter the originals are stapled. This control program may be stored in a hard disk of the computer or in a floppy disk used by the computer. This control program is made of codes representative of the flow shown in FIGS. 11A and 11B. An image to be displayed or printed out is not limited to an original image, but images generated by software of the computer or the like.

Instead of the stapler unit, a punching unit may be used for punching out holes in originals at desired positions. In this case, the punching position is displayed as a synthesized preview image.

What is claimed is:

1. An image processing apparatus comprising:

input means for inputting an image to be formed on a sheet;

display means for displaying the image to be formed on the sheet and input by said input means;

designating means for designating a binding position of the sheets on which the images input by said input means are formed; and display control means for causing said display means to display the image to be formed on the sheet and input by said input means, together with a mark indicating the binding position of the sheets designated by said designating means.

2. An image processing apparatus according to claim 1, further comprising:

image forming means for forming an image input by said input means on a sheet; and binding processing means for executing a binding process for sheets on which images are formed by said image forming means.

3. An image processing apparatus according to claim 2, further comprising rotation processing means for executing a rotation process for an image input from said input means, wherein said binding processing means executes a binding process at a predetermined side of a sheet discharged from said image forming means, and said rotation processing means executes a rotation process in accordance with a designation by said designating means to make said image forming means form a rotation processed image.

4. An image processing apparatus according to claim 2, wherein said display means displays an image prior to an image forming process by said image forming means.

5. An image processing apparatus according to claim 2, further comprising editing means for editing an image input from said input means, wherein said display means displays an image edited by said editing means, and said image forming means forms the image edited by said editing means.

6. An image processing method comprising:

an inputting step for inputting an image to be formed on a sheet;

a displaying step for displaying the image to be formed on the sheet and input in said inputting step;

a designating step for designating a binding position of the sheets on which the images input in said inputting step are formed; and a display controlling step for causing said displaying step to display the image to be formed on the sheet and input in said inputting step, together with a mark indicating the binding position of sheets designated in said designating step.

7. An image processing method according to claim 6, further comprising:

an image forming step for forming an image input in said inputting step on a sheet; and a binding step for executing a binding process for sheets on which images are formed in said image forming step.

8. An image process method according to claim 7, further comprising a rotation executing step for executing a rotation process for an image input in said inputting step, wherein said binding step executes a binding process at a predetermined side of a sheet discharged at said image forming step; and said rotation executing step executes a rotation process in accordance with a designation in said designating step to make said image forming step from a rotation processed image.

9. An image processing method according to claim 7, wherein said displaying step displays an image prior to an image forming process in said image forming step.

10. An image processing method according to claim 7, further comprising an editing step for editing an image input in said inputting step, wherein said displaying step displays an image edited in said editing step, and said image forming step forms the image edited in said editing step.

11. An image processing apparatus comprising:

input means for inputting an image to be formed on a sheet;

display means for displaying the image to be formed on the sheet and input by said input means;

designating means for designating a sheet processing position in the sheets on which the images input by said input means are formed; and display control means for causing said display means to display the image to be formed on the sheet and input by said input means, together with a mark indicating the sheet processing position in the sheets designated by said designating means.

12. An image processing apparatus according to claim 11, further comprising:

image forming means for forming the image input by said input means on the sheet; and sheet processing means for executing a sheet process for the sheets on which the images are formed by said image forming means.

13. An image processing apparatus according to claim 12, further comprising rotation processing means for executing a rotation process for the image input by said input means, wherein said sheet processing means executes the sheet process at a predetermined side of the sheet discharged from said image forming means, and said rotation processing means executes the rotation process in accordance with the designation by said designating means to make said image forming means form the rotation processed image.

14. An image processing apparatus according to claim 12, wherein said display means displays an image prior to an image forming process by said image forming means.

15. An image processing apparatus according to claim 12, further comprising editing means for editing an image input from said input means, wherein said display means displays an image edited by said editing means, and said image forming means forms the image edited by said editing means.

16. An image processing apparatus according to claim 11, wherein the sheet process is a sheet punching process.

17. An image processing method comprising:

an inputting step for inputting an image to be formed on a sheet;

a displaying step for displaying the image to be formed on the sheet and input in said inputting step;

a designating step for designating a sheet processing position in the sheets on which the images input in said inputting step are formed; and a display controlling step for causing said display step to display the image to be formed on the sheet and input in said inputting step, together with a mark indicating the sheet processing position in the sheets designated in said designating step.

18. An image processing method according to claim 17, further comprising:

an image forming step for forming the image input in said inputting step on the sheet; and a sheet processing step for executing a sheet process for the sheets on which the images are formed in said image forming step.

19. An image processing method according to claim 18, further comprising a rotation processing step for executing a rotation process for the image input in said input step, wherein said sheet processing step executes the sheet process at a predetermined side of the sheet discharged in said image forming step, and said rotation processing step executes the rotation process in accordance with the designation in said designating step to make said image forming step form the rotation-processed image.

20. An image processing method according to claim 18, wherein said display step displays the image prior to an image forming process in said image forming step.

21. An image processing method according to claim 18, further comprising an editing step for editing an image input in said inputting step, wherein said displaying step displays the image edited in said editing step, and said image forming step forms the image edited in said editing step.

22. An image processing method according to claim 17, wherein said sheet process is a punching process on the sheet.

23. An image processing apparatus according to claim 11, wherein the sheet processing is a stapling process on the sheet.

24. An image processing method according to claim 17, wherein the sheet processing is a stapling process on the sheet.

* * * * *

UNITED STATES PATENT AND TRADEMARK OFFICE
CERTIFICATE OF CORRECTION

PATENT NO. : 6,115,510
DATED : September 5, 2000
INVENTOR(S) : Katsuhide Koga

It is certified that error appears in the above-identified patent and that said Letters Patent is hereby corrected as shown below:

COLUMN 1:
Line 51, "process" should read --process.--.

COLUMN 5:
Line 1, "enable" should read --enabled--.

COLUMN 6:
Line 11, "If" should read --In--.

COLUMN 9:
Line 4, "descried" should read --described--.

COLUMN 13:
Line 21, "process" should read --processing--.

Signed and Sealed this

Twelfth Day of June, 2001

*Attest:*

Nicholas P. Godici

NICHOLAS P. GODICI
*Attesting Officer*  *Acting Director of the United States Patent and Trademark Office*